United States Patent
Yang et al.

(10) Patent No.: US 11,895,047 B2
(45) Date of Patent: Feb. 6, 2024

(54) SRS DESIGN SUPPORTING MULTIPLE ANTENNAS

(71) Applicant: QUALCOMM Incorporated, San Diego, CA (US)

(72) Inventors: Wei Yang, San Diego, CA (US); Weimin Duan, San Diego, CA (US); Alexandros Manolakos, Escondido, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 127 days.

(21) Appl. No.: 17/069,850

(22) Filed: Oct. 13, 2020

(65) Prior Publication Data

US 2021/0111847 A1  Apr. 15, 2021

(30) Foreign Application Priority Data

Oct. 14, 2019  (GR) .............................. 20190100455

(51) Int. Cl.
*H04L 5/00* (2006.01)
*H04W 72/1268* (2023.01)

(52) U.S. Cl.
CPC ....... *H04L 5/0048* (2013.01); *H04W 72/1268* (2013.01)

(58) Field of Classification Search
CPC ... H04L 5/0023; H04L 5/0048; H04L 5/0091; H04L 5/005; H04L 5/0092; H04L 5/1469; H04L 5/0007; H04W 72/0413; H04W 72/046; H04B 7/0421; H04B 7/0456; H04B 7/0691
See application file for complete search history.

(56) References Cited

U.S. PATENT DOCUMENTS

| | | | | |
|---|---|---|---|---|
| 2018/0367205 A1* | 12/2018 | Liu | ....................... | H04W 24/10 |
| 2019/0103949 A1* | 4/2019 | Harrison | .............. | H04B 7/0691 |
| 2019/0109679 A1* | 4/2019 | Liu | ...................... | H04B 7/0404 |
| 2019/0140729 A1* | 5/2019 | Zhang | ................... | H04W 52/16 |

(Continued)

FOREIGN PATENT DOCUMENTS

WO   2019-047972 A1   3/2019

OTHER PUBLICATIONS

International Search Report and Written Opinion dated Feb. 11, 2021 from corresponding PCT Application No. PCT/US2020/055597.

(Continued)

*Primary Examiner* — Yee F Lam
(74) *Attorney, Agent, or Firm* — Arun Swain

(57) ABSTRACT

A user equipment (UE) sends an indication supported combinations of sounding reference signal (SRS) resources, unsupported combinations of SRS resources, or compatible SRS resources to a base station. The base station selects one or more SRS resources for the UE from the SRS resources that are supported by the UE or are compatible for the UE. In some examples, the UE receives a configuration from the base station for multiple SRS resource sets. After configuring the UE with multiple SRS resource sets, the base station selects one of the SRS resources sets, and may indicate the selected SRS resource set to the UE. The UE transmits a physical uplink shared channel (PUSCH) to the base station using SRS resources from the selected SRS resource set.

21 Claims, 26 Drawing Sheets

(56) References Cited

U.S. PATENT DOCUMENTS

| | | | | |
|---|---|---|---|---|
| 2019/0149299 A1* | 5/2019 | Lee | ................... | H04L 5/0092 |
| | | | | 370/329 |
| 2019/0174466 A1* | 6/2019 | Zhang | ................... | H04L 5/0048 |
| 2019/0174527 A1* | 6/2019 | Park | ................... | H04L 5/0051 |
| 2019/0327693 A1* | 10/2019 | Rahman | ............. | H04W 52/146 |
| 2020/0162133 A1* | 5/2020 | Harrison | ............. | H04B 7/0456 |

OTHER PUBLICATIONS

Ericsson: "Corrections for Non-Codebook Based UL MIMO", 3GPP Draft; R1-1806212 Non-Codebook Based UL MIMO Corrections, 3rd Generation Partnership Project (3GPP), Mobile Competence Centre ; 650, Route Des Lucioles ; F-06921 Sophia-Antipolis Cedex ; France,vol. RAN WG1, No. Busan, Korea; May 21, 2018-May 25, 2018 May 20, 2018 (May 20, 2018), XP051441421, Retrieved from the Internet: URL:http://www.3gpp.org/ftp/Meetings%5F3G PP%5FSYNC/RAN 1 /Docs/ [retrieved on May 20, 2018].

* cited by examiner

| Bit field mapped to index | SRI(s), $N_{SRS} = 4$ |
|---|---|
| 0 | 0 |
| 1 | 1 |
| 2 | 2 |
| 3 | 3 |
| 4 | 0, 1 |
| 5 | 0, 2 |
| 6 | 0, 3 |
| 7 | 1, 2 |
| 8 | 1, 3 |
| 9 | 2, 3 |
| 10-15 | reserved |

SRS DESIGN SUPPORTING MULTIPLE ANTENNAS

CROSS REFERENCE TO RELATED APPLICATION(S)

This application claims the benefit of Greek Patent Application Serial No. 20190100455, entitled "SRS DESIGN SUPPORTING MORE THAN FOUR ANTENNAS" and filed on Oct. 14, 2019, the disclosure of which is expressly incorporated by reference herein in its entirety.

BACKGROUND

Technical Field

The present disclosure relates generally to wireless communication, and more particularly, to techniques for transmission of a sounding reference signal (SRS) for multiple antennas.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (such as with Internet of Things (IoT)), and other requirements. 5G NR includes services associated with enhanced mobile broadband (eMBB), massive machine type communications (mMTC), and ultra reliable low latency communications (URLLC).

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Wireless communication may include the transmission of a sounding reference signal (SRS) by a user equipment (UE) to a base station. SRSs are reference signals transmitted on the uplink path that are used to sound a set of ports on at least a portion of a system bandwidth over a set of symbols. For example, SRS transmission by a UE may be configured on SRS resources of an SRS resource set, with SRS transmission on each SRS resource being used over a respective symbol to sound a respective portion of a full bandwidth, such as a full uplink bandwidth or a configured portion of an uplink bandwidth.

When the UE sounds ports via SRS transmission, the base station is able to determine various characteristics of the wireless medium on which the base station and the UE communicate. For example, the base station may determine channel quality of the uplink path using SRSs received from the UE. Additionally or alternatively, the base station may use SRSs for uplink frequency selective scheduling and/or uplink timing estimation in connection with communicating with the UE.

A UE may use different antennas to transmit an SRS on SRS resources of an SRS resource set, with SRS transmission on each SRS resource of the set being concurrent (e.g., simultaneous). In some configurations, however, a UE may have more antennas than transmit chains, which may lead to challenges in transmission of the SRS.

In particular, the UE may be unable to concurrently transmit an SRS on multiple SRS resources of the SRS resource set because the limited number of transmit chains imposes constraints on the UE with respect to how many and which antennas can be concurrently used. That is, the number of antennas used for SRS transmission generally cannot exceed the number of transmit chains because the number of antennas used for SRS transmission is based on the number of transmit chains.

Illustratively, the UE may be unable to use some combinations of SRS resources to transmit on a physical uplink shared channel (PUSCH) based on the number of transmit chains with which the UE is configured. Such combinations of SRS resources may use multiple antennas from which concurrent SRS transmission is unachievable due to the limited number of transmit chains. Consequently, combinations of SRS resources using multiple antennas from which concurrent SRS transmission is unachievable may not accurately sound all antennas on the PUSCH (or other bandwidth).

Aspects presented herein provide various techniques and solutions for SRS transmission using multiple antennas at a UE. According to some aspects, the present disclosure provides for reporting information affecting SRS transmission to a base station. For example, the UE may report information related to characteristics of the UE having an effect on SRS transmission, such as conditions imposed upon on the UE by transmit chains or other components (e.g., power amplifiers). In other examples, the UE may report combinations of SRS resources that are supported and/or are unsupported, such as some combinations of SRS resources that are supported by virtue of allowing for concurrent SRS transmission using some antennas and/or other combinations of SRS resources that are unsupported due to limitations on the use of other antennas imposed by the transmit chains (that is, imposed by the number of transmit chains).

Thus, SRS transmission by the UE may be configured to according to combinations of SRS resources that are supported and/or unsupported by the UE. For example, a base station may configure an SRS resource set (or SRS resources thereof) to accommodate an unequal ratio of transmit antennas to transmit chains at the UE. Various techniques and approaches described herein may be further applicable to other multi-access technologies and the telecommunication standards that employ these technologies.

In an aspect of the disclosure, a method, a computer-readable medium, and an apparatus are provided for wireless communication at a UE. The apparatus receives a configuration from a base station for an SRS resource set for non-codebook-based SRS. The SRS resource set includes a plurality of SRS resources, where each SRS resource in the SRS resource set is associated with a corresponding SRS port. The apparatus transmits a message to the base station indicating at least one of supported combinations of SRS resources or unsupported combinations of SRS resources. In some implementations, the message may include a UE capability message. In some implementations, the apparatus may receive an SRS resource indicator (SRI) from the base station scheduling uplink transmissions based on the supported combinations of SRS resources and may transmit a PUSCH to the base station based on the SRI.

In an aspect of the disclosure, a method, a computer-readable medium, and an apparatus are provided for wireless communication at a base station. The apparatus The apparatus configures a UE for an SRS resource set for non-codebook-based SRS. The SRS resource set includes a plurality of SRS resources, where each SRS resource in the SRS resource set is associated with a corresponding SRS port. The apparatus receives a message from the UE indicating at least one of supported combinations of SRS resources or unsupported combinations of SRS resources for the UE. The apparatus selects one or more SRS resources for the UE from the supported combinations of SRS resources for the UE. In some implementations, the indication may be included in a UE capability message.

In an aspect of the disclosure, a method, a computer-readable medium, and an apparatus are provided for wireless communication at a UE. The apparatus receives a configuration from a base station for an SRS resource set for non-codebook-based SRS. The SRS resource set includes a plurality of SRS resources, where each SRS resource in the SRS resource set is associated with a corresponding SRS port. The apparatus transmits an indication of compatible SRS resources to the base station from among the plurality of SRS resources for the SRS resource set configured for the UE. In some implementations, the indication may be included in a UE capability message. In some implementations, the apparatus may receive an SRI from the base station scheduling uplink transmissions based on the supported combinations of SRS resources and may transmit a PUSCH to the base station based on the SRI.

In an aspect of the disclosure, a method, a computer-readable medium, and an apparatus are provided for wireless communication at a base station. The apparatus The apparatus configures a UE for an SRS resource set for non-codebook-based SRS. The SRS resource set includes a plurality of SRS resources, where each SRS resource in the SRS resource set is associated with a corresponding SRS port. The apparatus receives an indication of compatible SRS resources for the UE from among the plurality of SRS resources for the SRS resource set configured for the UE. The apparatus selects one or more SRS resources for the UE from the compatible SRS resources for the UE. In some implementations, the indication may be included in a UE capability message.

In an aspect of the disclosure, a method, a computer-readable medium, and an apparatus are provided for wireless communication at a UE. The apparatus receives a configuration from a base station for multiple SRS resource sets for non-codebook-based SRS. The SRS resource set includes a plurality of SRS resources, where each SRS resource in the SRS resource set is associated with a corresponding SRS port. The apparatus receives a selection from the base station of an SRS resource set configured for the UE and transmits a PUSCH to the base station using one or more SRS resource from the selected SRS resource set. In some implementations, the apparatus may determine compatible SRS ports corresponding to the plurality of SRS resources comprised in a corresponding SRS resource set.

In an aspect of the disclosure, a method, a computer-readable medium, and an apparatus are provided for wireless communication at a base station. The apparatus configures a UE for multiple SRS resource sets for non-codebook-based SRS. The SRS resource set includes a plurality of SRS resources, where each SRS resource in the SRS resource set is associated with a corresponding SRS port. The apparatus select an SRS resource set from the multiple SRS resource sets configured for the UE. The apparatus transmits one or more SRI to the UE for the selected SRS resource set and receives a PUSCH transmission from the UE based on the one or more SRI.

To the accomplishment of the foregoing and related ends, the one or more aspects include the features hereinafter fully described and particularly pointed out in the claims. The following description and the annexed drawings set forth in detail some illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 10 is a table illustrating example SRS resource combinations and an index field corresponding to each SRS resource combination.

DETAILED DESCRIPTION

Figure 1:
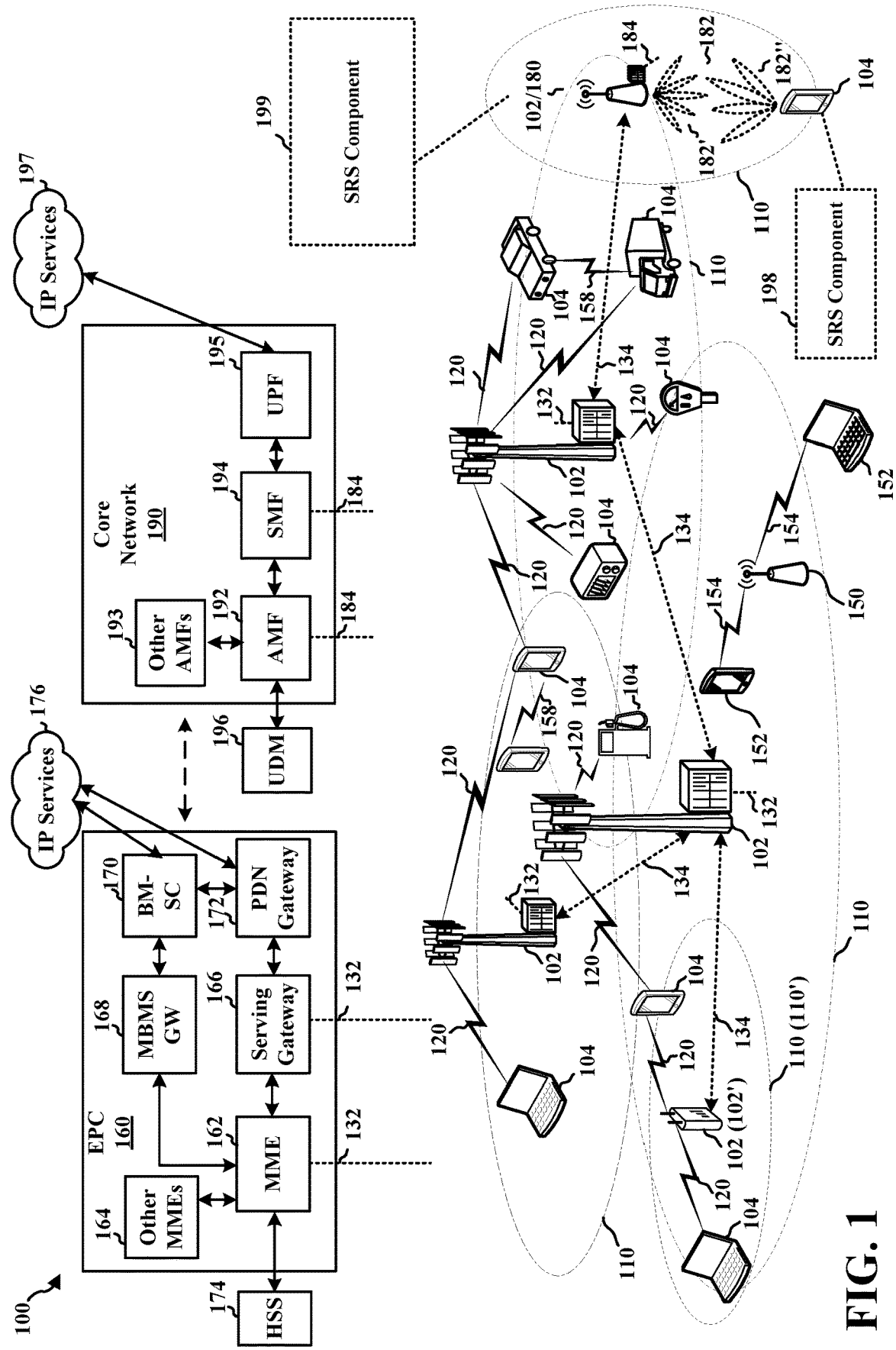
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those of ordinary skill in the art that these concepts may be practiced without these specific details. In some instances, structures and components are shown in block diagram form in order to avoid obscuring such concepts.

In order to transmit, a user equipment (UE) generates signals that are then applied to antennas. Generally, multiple components contribute to the process of accurately and powerfully transmitting signals from antennas. Many of these components are included in transmit chains. Specifically, a transmit chain may include at least one of a modulator, an encoder, a power amplifier, a mixer, a filter, a convertor, and/or other such components (e.g., front-end components) configured to apply a signal to an antenna for transmission. Thus, a transmit chain may be used for signal transmission from an antenna.

However, some UEs may include more antennas than transmit chains. The UE may be limited to using a number of antennas at a particular time based on the number of transmit chains; that is, the number of antennas used generally cannot exceed the number of transmit chains because the number of antennas will be based on the number of transmit chains. A UE may transmit a sounding reference signal (SRS) to sound different antennas. However, it might not be possible for a UE to use some combinations of SRS resources to transmit a physical uplink shared channel (PUSCH). The present disclosure provides ways for a UE to assist a base station in avoiding scheduling the UE for uplink transmissions based on unsupported combinations of SRS resources or incompatible SRS resources.

Various aspects of the present disclosure generally relate to techniques and approaches to SRS transmission by a UE having a greater number of antennas than transmit chains. Some aspects more specifically relate to providing a base station with information related to SRS resources and/or SRS resource sets, which may facilitate configuration of SRS resources and/or SRS resource sets for the UE by the base station. In some examples, the base station configures the UE with an SRS resource set for non-codebook-based SRS transmission, and in response, the UE informs the base station of combinations of SRS resources that are supported and/or combinations of SRS resources that are unsupported. In some further examples, the base station may select one or more SRS resources for the UE from the combination of SRS resources that are supported by the UE.

In some additional or alternative examples, the UE may send an indication of compatible SRS resources to the base station. Compatible SRS resources may be SRS resources on which the UE may transmit a PUSCH transmission. The base station may then configure the UE with one or more SRS resources based on the indication of compatible SRS resources received from the UE. Accordingly, the UE may receive, from the base station a configuration of one or more SRS resources, which may include a configuration of one or more multiple SRS resource sets. After configuring the UE with multiple SRS resource sets, the base station may select one of the SRS resources sets, and may indicate the selected SRS resource set to the UE. The UE may transmit a PUSCH to the base station using SRS resources from the selected SRS resource set.

Particular implementations of the subject matter described in this disclosure can be implemented to realize one or more of the following potential advantages. In some implementations, the described techniques can be used to avoid scheduling a UE based on combinations of SRS resources that are not supported by the UE, e.g., so that the UE will not be configured with SRS resources on which the UE is unable to concurrently transmit SRSs using multiple antennas. Additionally, the described techniques and approaches may enable a base station to select from multiple SRS resource sets configured for the UE, e.g., so that the base station is able to select an SRS resource set that is suitable for traffic load on the base station, traffic load on the UE, channel conditions, and/or other factors.

Several aspects of telecommunication systems will now be presented with reference to various apparatus and methods. These apparatus and methods will be described in the following detailed description and illustrated in the accompanying drawings by various blocks, components, circuits, processes, algorithms, among other examples (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, among other examples, whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (for example, a 5G Core (5GC)). The base stations 102 may include macrocells (high power cellular base station) or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (for example, an S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (for example, handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (for example, through the EPC 160 or core network 190) with each other over third backhaul links 134 (for example, X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102a may have a coverage area 110a that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 or downlink (DL) (also referred to as forward link) transmissions from a base station 102 to a UE 104. The communication links 120 may use multiple-input and multiple-output (MIMO) antenna technology, including spatial multiplexing, beamforming, or transmit diversity. The communication links may be through one or more carriers. The base stations 102/UEs 104 may use spectrum up to Y MHz (for example, 5, 10, 15, 20, 100, 400 MHz, among other examples) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (for example, more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Some UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102a may operate in a licensed or an unlicensed frequency spectrum. When operating in an unlicensed frequency spectrum, the small cell 102a may employ NR and use the same 5 GHz unlicensed frequency spectrum as used by the Wi-Fi AP 150. The small cell 102a, employing NR in an unlicensed frequency spectrum, may boost coverage to or increase capacity of the access network.

A base station 102, whether a small cell 102a or a large cell (for example, macro base station), may include or be referred to as an eNB, gNodeB (gNB), or another type of base station. Some base stations, such as gNB 180 may operate in a traditional sub 6 GHz spectrum, in millimeter wave (mmW) frequencies, or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (for example, 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, or antenna arrays to facilitate the beamforming.

The base station 180 may transmit a beamformed signal to the UE 104 in one or more transmit directions 182a. The UE 104 may receive the beamformed signal from the base station 180 in one or more receive directions 182b. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, or other IP services.

The base station may include or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (for example, MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (for example, parking meter, gas pump, toaster, vehicles, heart monitor, among other examples). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in some aspects, the UE 104 may include an SRS component 198 configured to indicate to a base station 102 or 180 supported combinations of SRS resources, unsupported combinations of SRS resources, or compatible SRS resources. The base station 102 or 180 may include an SRS component 199 that is configured to select SRS resources for the UE based on the indication received from the UE in order to avoid scheduling the UE based on unsupported combinations of SRS resources or incompatible SRS resources. In some examples, the SRS component 198 of the UE 104 may be configured to receive a configuration from the base station 102 or 180 for multiple SRS resource sets and then to receive a selection from the base station of one of the SRS resource sets. The SRS component 199 of the base station 102 or 180 may configure the UE 104 with multiple SRS resource sets and may select an SRS resource set for the UE from the multiple SRS resource sets configured for the UE. Although the following description may be focused on 5G NR, the concepts described herein may be applicable to other similar areas, such as LTE, LTE-A, CDMA, GSM, and other wireless technologies.

Figure 2:
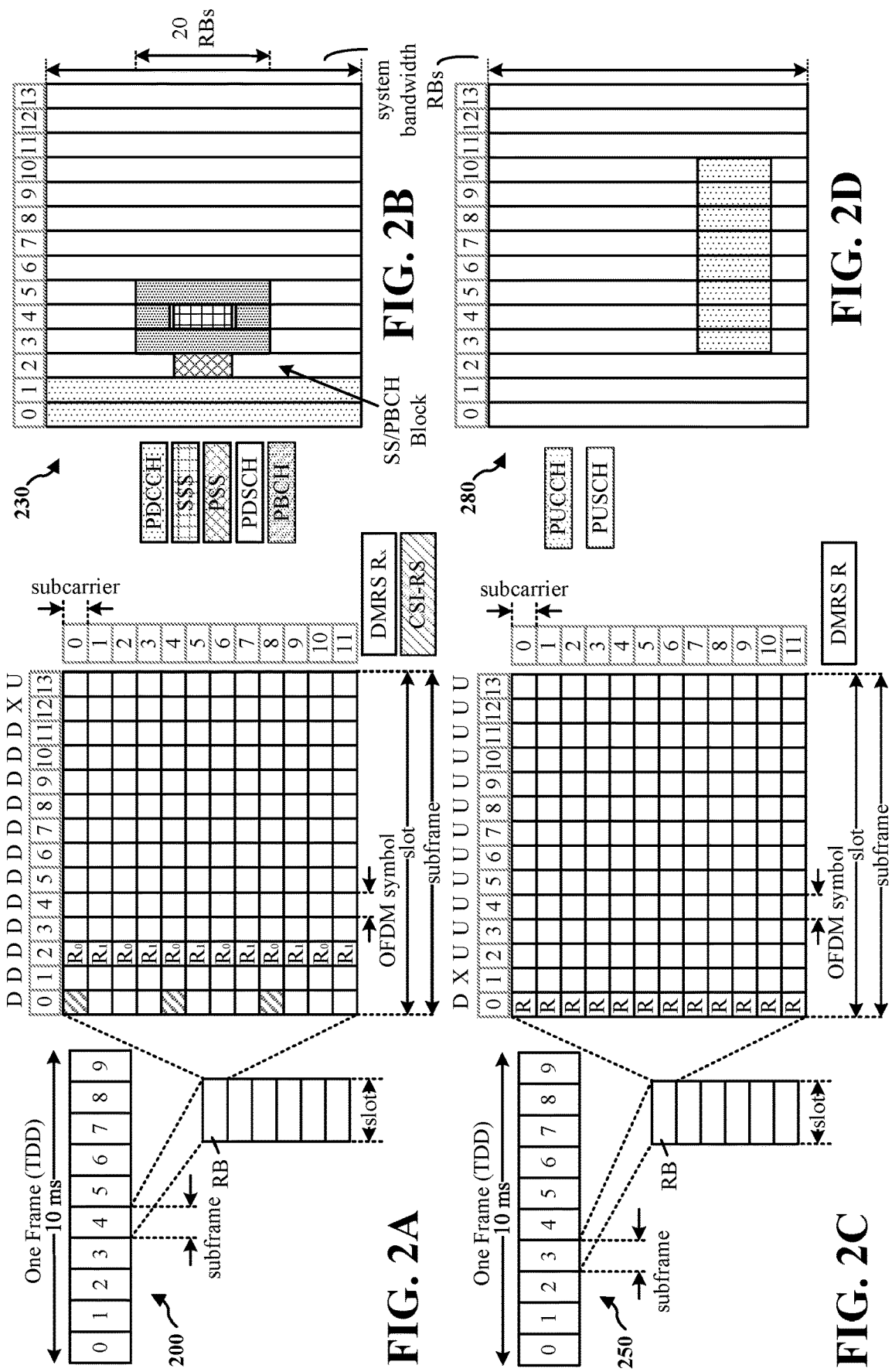
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description presented herein applies also to a 5G/NR frame structure that is TDD.

Other wireless communication technologies may have a different frame structure or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu * 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), or UCI.

Figure 3:
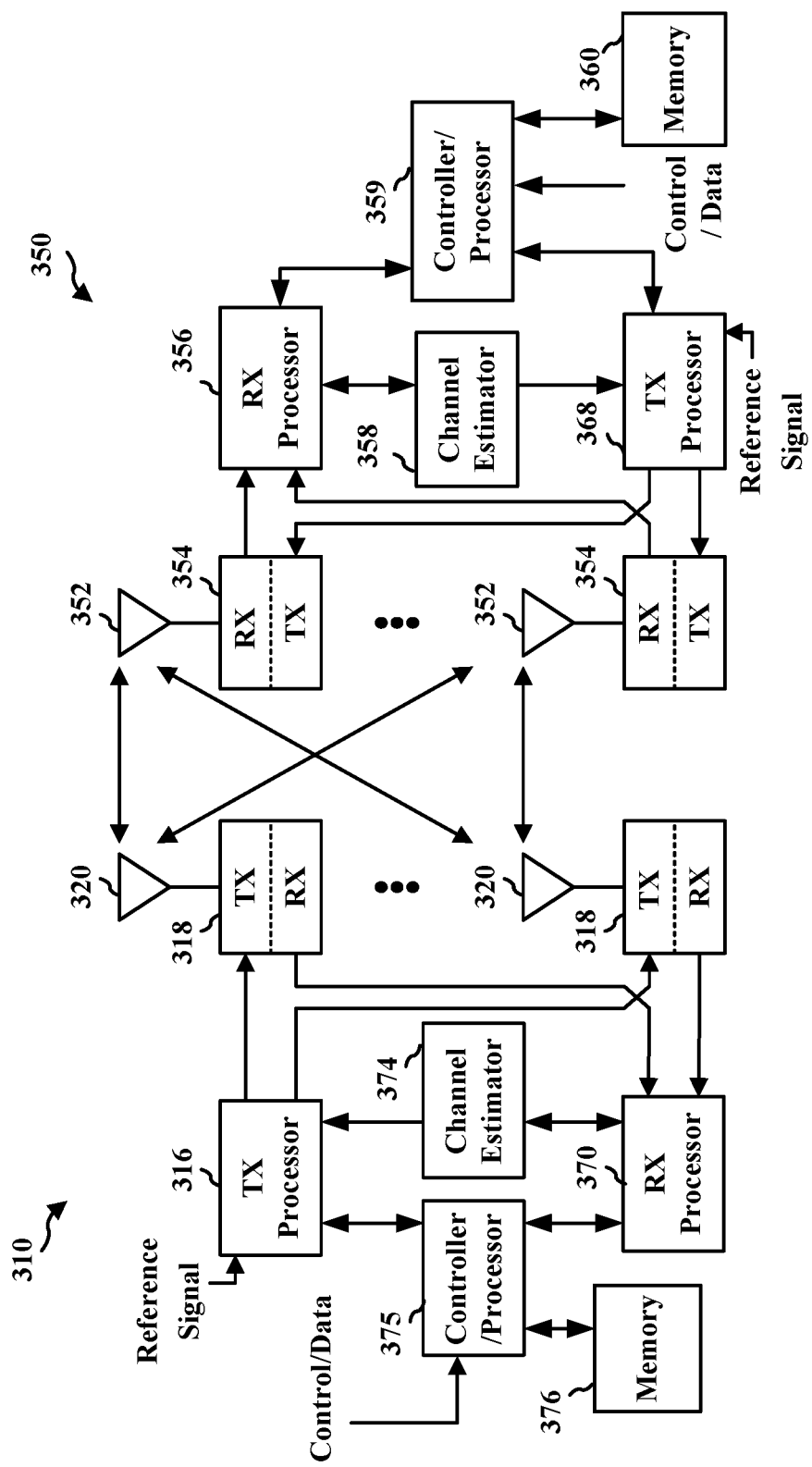
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (such as MIB, SIBs), RRC connection control (such as RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (such as binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (such as a pilot) in the time or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK or NACK protocol to support HARQ operations.

Similar to the functionality described in connection with the DL transmission by the base station 310, the controller/processor 359 provides RRC layer functionality associated with system information (for example, MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

Figure 4:
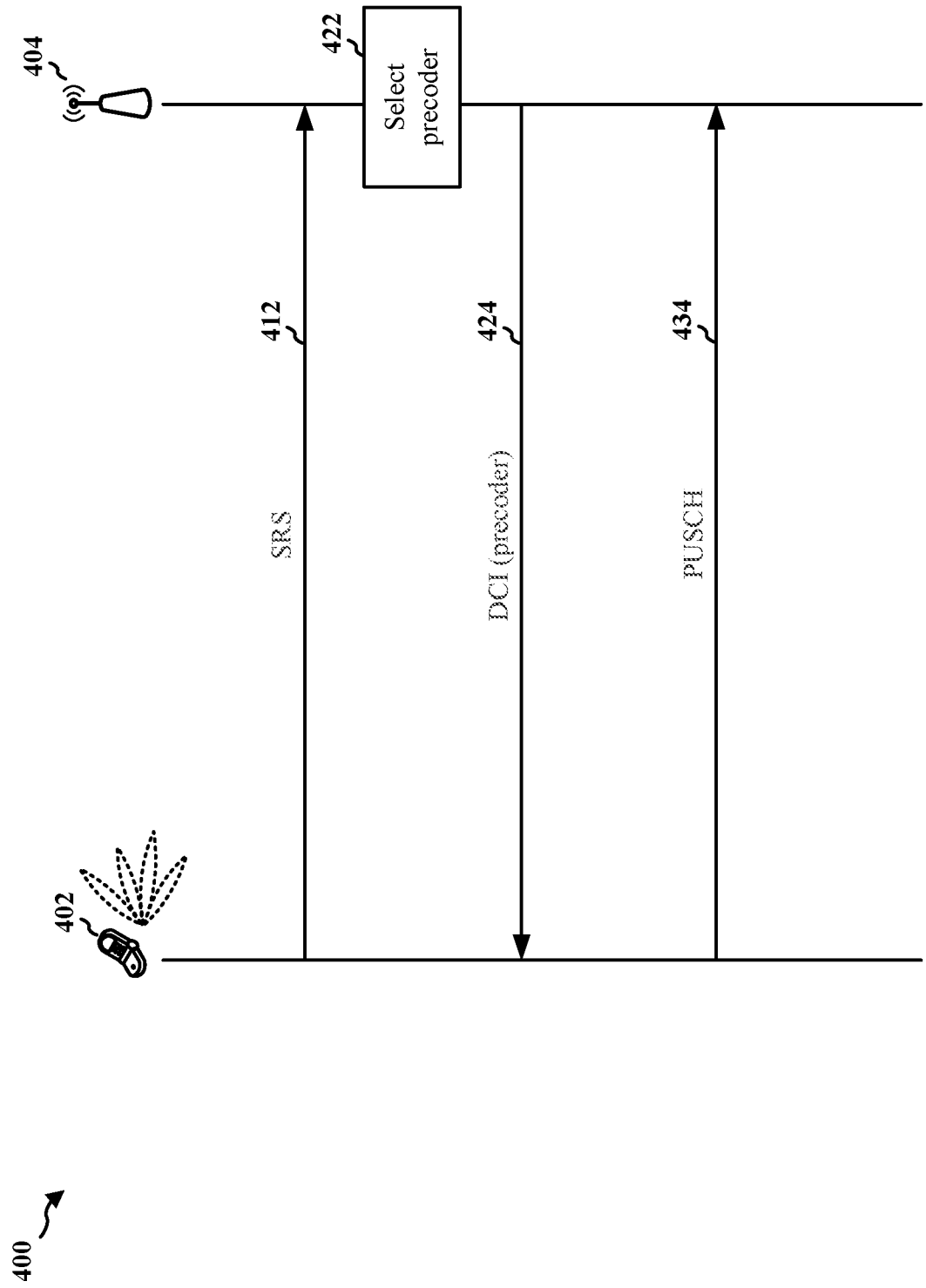
FIG. 4 is a diagram illustrating an example communication flow between a UE and a base station including codebook-based multiple input multiple output (MIMO) physical uplink shared channel (PUSCH) transmissions.

A UE may transmit PUSCH using a codebook-based MIMO transmission mode or a non-codebook-based MIMO transmission mode. FIG. 4 is a diagram illustrating an example communication flow 400 between a UE 402 and a base station 404 for codebook-based MIMO PUSCH transmissions. The UE 402 may sound each of multiple antennas by transmitting a sounding reference signal (SRS) 412 using the corresponding antenna (or antenna port). The base station 404 receives the SRS 412 from the UE 402 and uses the received SRS 412 to select, at 422, a precoder from a codebook for the UE to use for MIMO PUSCH transmissions. For example, the base station 404 may include a table of precoders corresponding to received SRS values and may select the precoder from the table corresponding to the SRS 412 received from the UE 402. In some aspects, the base station 404 may be preconfigured with the table of precoders and may select the precoder from the table based on the SRS 412 received from the UE 402. The base station 404 may transmit DCI 424 to the UE 402, such as an uplink grant. The DCI 424 may indicate the precoder selected by the base station 424. The UE may then transmit a PUSCH transmission 434 to the base station 404 using the selected precoder.

Figure 5:
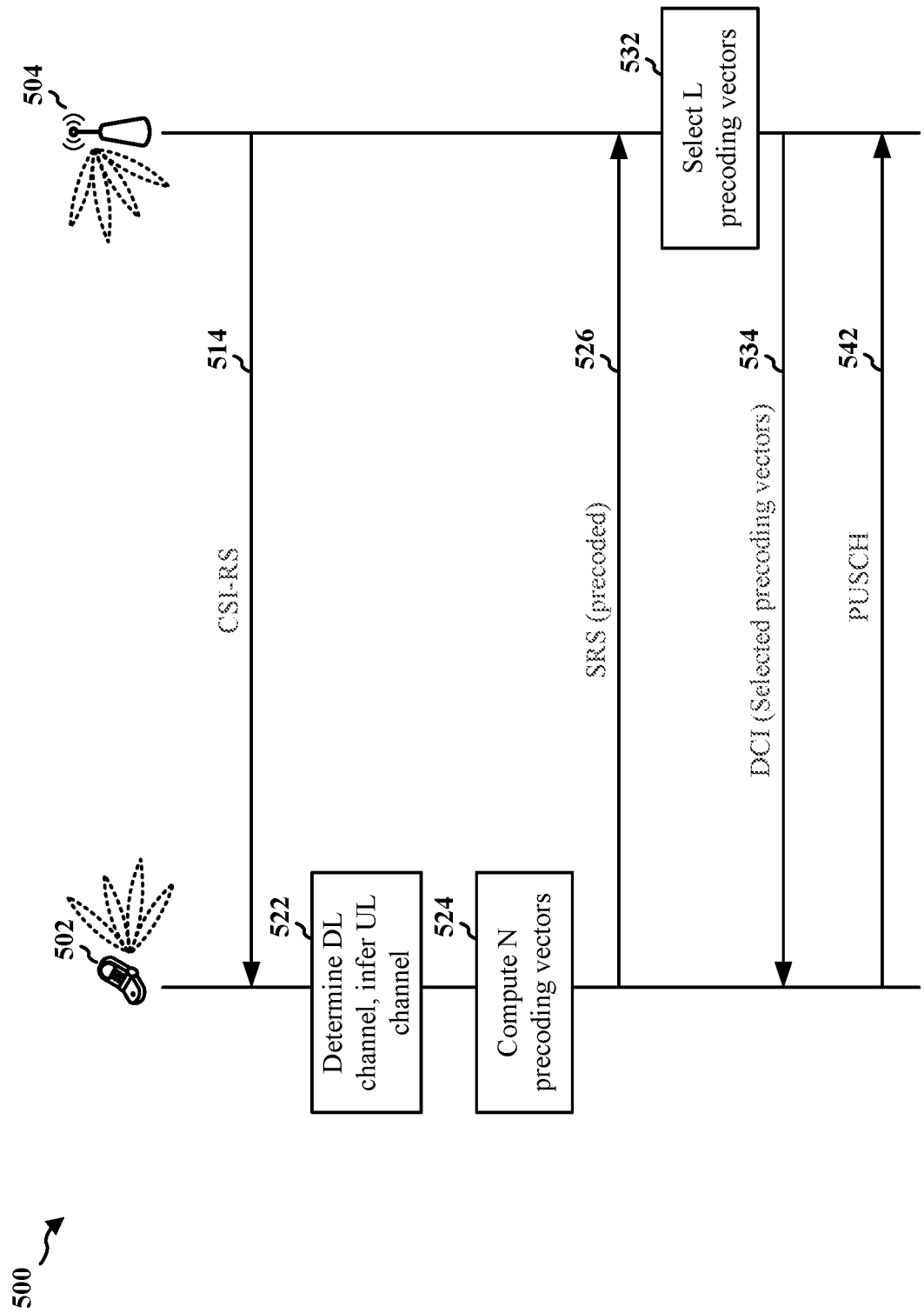
FIG. 5 is a diagram illustrating an example communication flow between a UE and a base station including non-codebook-based MIMO PUSCH transmissions.

FIG. 5 is a diagram illustrating an example communication flow 500 between a UE 502 and a base station 504 using non-codebook-based MIMO PUSCH transmission. The base station 504 may transmit a channel state information reference signal (CSI-RS) 514 to a UE 502. The UE 502 may receive the CSI-RS 514 and use the CSI-RS to determine, at 522, characteristics about the DL channel. Based on channel reciprocity, the UE 502 may infer that the UL channel may have the same or similar characteristics as the characteristics determined for the DL channel.

As illustrated at 524, the UE 502 may compute N precoding vectors. N may be a positive integer, and may, in some examples, be less than or equal to four in instances in which the UE 502 includes four antennas. Each precoding vector may support one layer for uplink transmission. The UE 502 may select or compute precoding vectors appropriate for MIMO communication over an UL channel having the characteristics inferred for the UL channel at 524. The UE 502 may then transmit SRS 526 precoded with the N precoding vectors to the base station 504 on SRS resources. One SRS resource, such as an SRS port, may be used for each precoding vector.

The base station 504 may receive the precoded SRS 526 and, as illustrated at 532, may select L of the N precoding vectors to be used in uplink MIMO transmissions between the UE 502 and the base station 504, where L is a positive integer less than or equal to N. The base station 504 may transmit DCI 534, such as an uplink grant, including the L selected precoding vectors or indicators thereof, to the UE 502. For example, the DCI 534 may include an SRS resource indicator (SRI) indicating which precoding vector or vectors was or were selected. The UE 502 may receive the DCI 534 and may transmit a PUSCH transmission 542 to the base station 504 using the selected precoding vector or vectors. The PUSCH transmission 542 may have a rank L, corresponding to the number of precoding vectors selected by the base station 504.

A UE capable of MIMO communication, such as the UE 402 or the UE 502, may include multiple antennas. The UE may include separate transmit and receive chains coupled to a physical antenna, and may utilize the physical antennas for both transmitting and receiving signals.

A transmit chain may include a power amplifier to generate a signal capable of being detected at the intended receiver. A receive chain may not include a power amplifier, or may include a smaller or less expensive power amplifier. In some aspects, a UE may include more receive chains than transmit chains. For example, in some implementations, a UE may include eight physical antennas, eight receive chains, and four transmit chains.

A transmit chain may only transmit on one physical antenna at a time. Continuing the example above, any transmit chain of the four transmit chains may be able to transmit on any of the eight antennas, but because each transmit chain may only transmit on one antenna at a time, the UE may only be able to transmit on four of the eight antennas simultaneously. Where a first precoding vector indicates a transmission should be on a first set of physical antennas, a second precoding vector indicates that a transmission should be on a second set of physical antennas, and the UE does not have enough transmit chains to transmit on both the first set of antennas and the second set of antennas simultaneously, the two precoding vectors may be referred to as "incompatible." That is, a precoding vector may be referred to as incompatible with another precoding vector when the UE cannot transmit using both precoding vectors at the same time. Accordingly, the precoding vectors selected for uplink communication between the UE and a base station cannot be incompatible.

Figure 6:
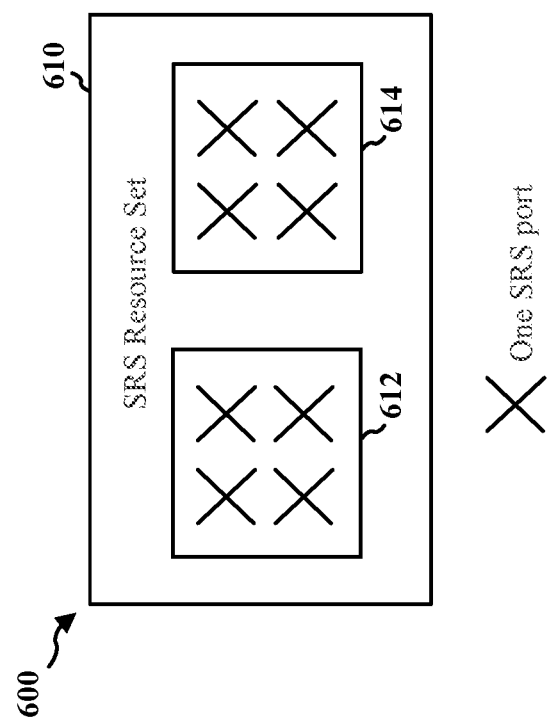
FIG. 6 is a diagram illustrating an example grouping of antennas for codebook-based PUSCH transmission.

FIG. 6 is a diagram illustrating an example grouping of antennas 600 for codebook-based PUSCH. The uplink communication may be a codebook-based MIMO transmission, such as described above with respect to FIG. 4, transmitted by a UE having eight antennas and four transmit chains. An SRS resource set 610 includes a first SRS resource 612 and a second SRS resource 614. Each SRS resource may include four SRS ports. The UE may separate the eight antennas into two groups of antennas, associate each SRS resource with a different group of antennas, and may transmit SRSs corresponding to the antenna group on the SRS ports for that SRS resource. Each transmit chain may transmit on one antenna in the first SRS resource 612 and on another antenna in the second SRS resource 614.

A base station may receive the SRSs transmitted on the SRS resource set 610. In selecting a precoder for uplink transmissions between the UE and the base station, for example as discussed above with respect to 422 of FIG. 4, the base station may select one of the first and second SRS resources 612 and 614. The base station may transmit the selected SRS resource to the UE. For example, the base station may transmit a one bit SRI in the DCI to indicate whether the first SRS resource 612 or the second SRS resource 614 was selected. The base station may also include a precoder to be used by the UE to precode the UL transmissions in the DCI. The precoder may be selected based on the SRSs of the selected SRS resource, such as from a fixed codebook as described above with respect to 422. The UE may transmit the PUSCH transmission on the antennas in the antenna group corresponding to the selected SRS resource using the provided precoder.

Figure 7:
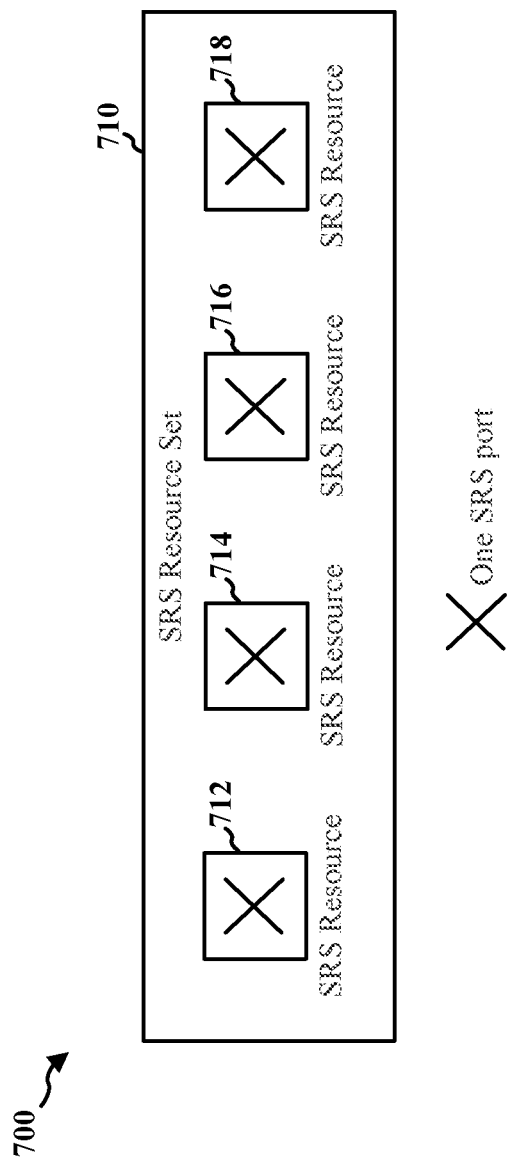
FIG. 7 is a diagram illustrating an example allocation of sounding reference signal (SRS) resources for non-codebook-based uplink communication.

FIG. 7 is a diagram illustrating an example allocation of SRS resources 700 for non-codebook-based uplink communication. The uplink communication may be a non-codebook-based MIMO transmission, such as described above with respect to FIG. 5. An SRS resource set 710 may include four SRS resources: SRS resource 712, SRS resource 714, SRS resource 716, and SRS resource 718. Each SRS resource may include one SRS port, and may be used to transmit an SRS precoded with one precoding vector (or in other words, to sound one beam).

The base station may select one or more precoding vectors of the received precoding vectors to be used by the UE in the uplink transmission, for example as discussed above with respect to 532 of FIG. 5. The base station may transmit an SRI indicating which precoding vectors were selected, for example by identifying the SRS resource or SRS resources corresponding to the selected precoding vectors.

Figure 8:
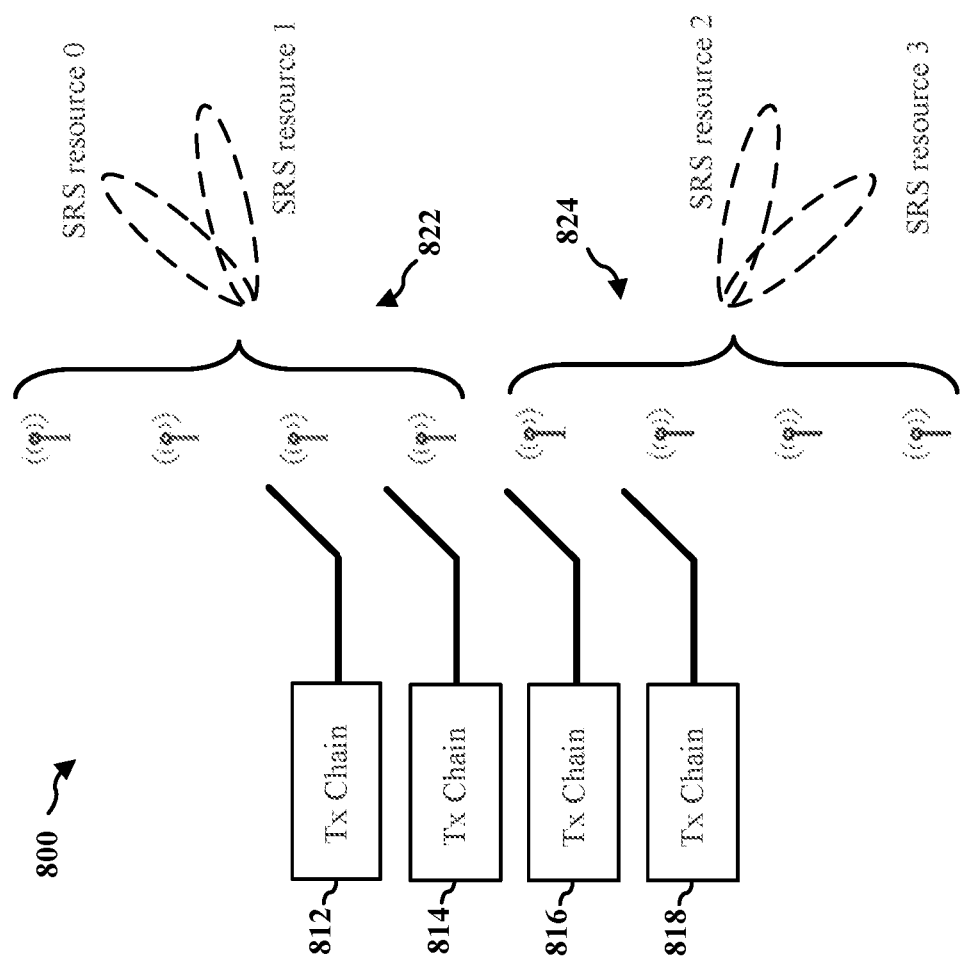
FIG. 8 is a diagram illustrating an example correspondence between SRS resources and corresponding antennas of a UE with more antennas than transmit chains.

FIG. 8 is a diagram illustrating a correspondence 800 between SRS resources and corresponding antennas of a UE with more antennas (e.g., physical antennas) than transmit chains. The UE includes four transmit chains 812, 814, 816, and 818, a first antenna group 822, and a second antenna group 824. The four transmit chains may each transmit on one antenna of the first antenna group 822 and on one antenna of the second antenna group 824. The four transmit chains may transmit a first precoded SRS on SRS resource 0 and a second precoded SRS on SRS resource 1 using the first antenna group 822, and may transmit a third precoded SRS on SRS resource 2 and a fourth precoded SRS on SRS resource 3 using the second antenna group 824. As both the antenna groups utilize the same four transmit chains, the UE may not be able to send a transmission utilizing the first antenna group 822 and the second antenna group 824 simultaneously. Accordingly, the UE may not be able to send a transmission precoded with a precoding vector corresponding to the first antenna group 822 and a transmission precoded with a precoding vector corresponding to the second antenna group 824 simultaneously. For example, the UE may be able to transmit utilizing the precoding vector transmitted on SRS resource 0 and the precoding vector transmitted on SRS resource 1 simultaneously, but the UE may not be able to transmit utilizing the precoding vector transmitted on SRS resource 0 and the precoding vector transmitted on SRS resource 2 simultaneously.

Referring again to FIG. 7, if the four SRS resources 712, 714, 716, and 718 correspond to the four SRS resources of FIG. 8, and if the base station selects precoding vectors corresponding to resources on different antenna groups, the UE will not be able to transmit the PUSCH utilizing the selected precoding vectors.

Figure 9:
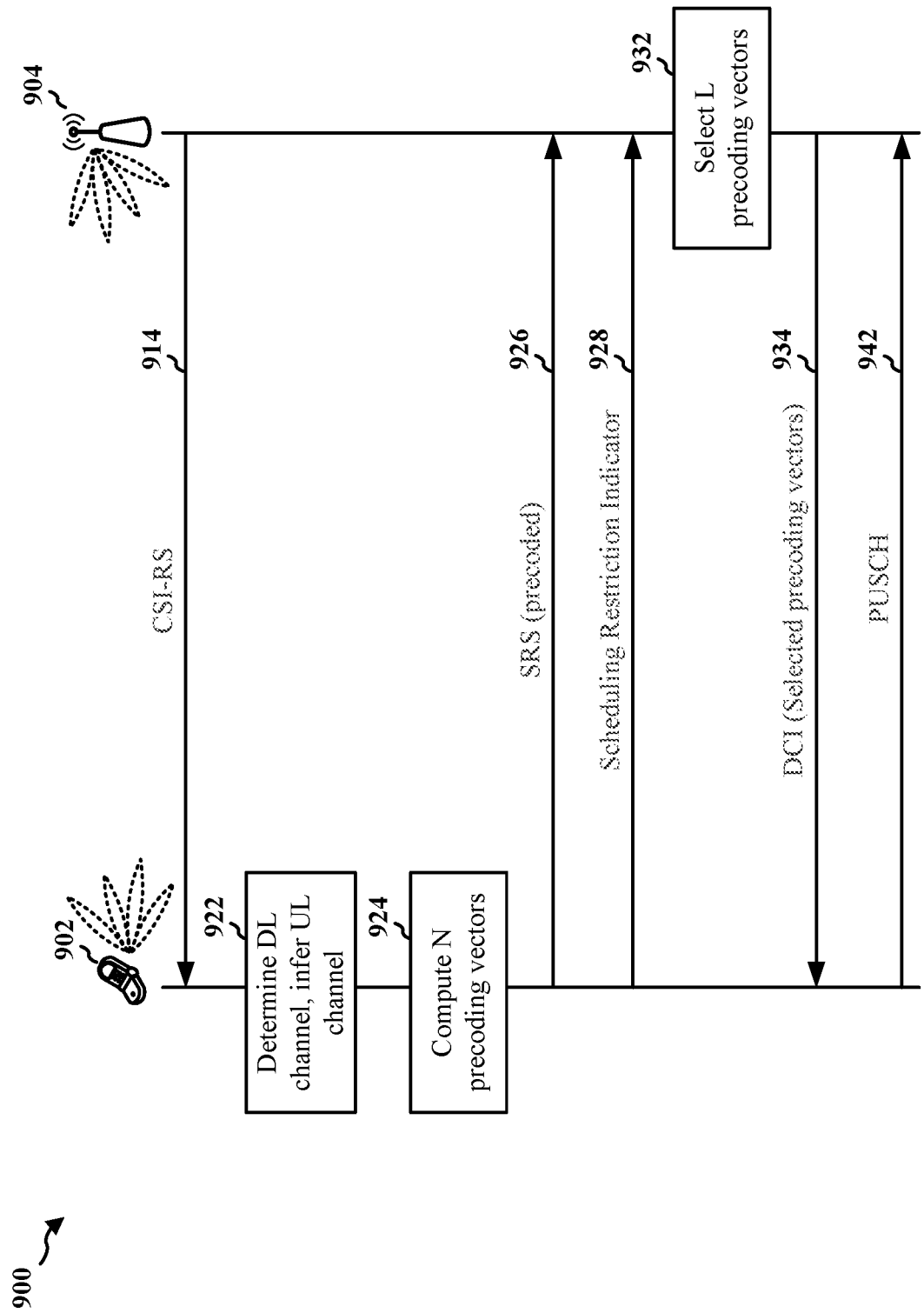
FIG. 9 is a diagram showing an example communication flow including non-codebook-based MIMO transmission that supports an indication of supported or unsupported combinations of SRS resources in accordance with aspects of the present disclosure.

FIG. 9 is a diagram showing a communication flow 900 including non-codebook-based MIMO transmission that supports an indication of supported or unsupported combinations of SRS resources in accordance with aspects of the present disclosure. The MIMO transmission may be performed by a UE 902 that includes more antennas than transmit chains. For example, the UE 902 may include eight antennas and four transmit chains. The base station 904 may transmit CSI-RS 914 to the UE 902, the UE 902 may determine the DL channel and infer the UL channel from the DL channel as illustrated at 922, and the UE 902 may compute N precoding vectors as illustrated at 924. This process may be performed as described above with respect to the CSI-RS 514, block 522, and block 524 of FIG. 5.

The UE may transmit SRSs 926 precoded with the N precoding vectors to the base station 904 on SRS resources, for example as described above with respect to FIG. 7. The antennas of the UE 902 may be split into two groups, and each precoding vector of the N precoding vectors may be transmitted to the base station 904 on an SRS resource corresponding to one antenna group or the other, for example as described above with respect to FIG. 8.

The UE 902 may also transmit a scheduling restriction indicator 928 to the base station 904. The scheduling restriction indicator 928 may indicate to the base station 904 which of the precoding vectors correspond to the same antenna group. The base station 904 may select L precoding vectors of the precoding vectors, all of which are identified as corresponding to the same antenna group by the scheduling restriction indicator 928. The base station 904 may then transmit DCI 934 to the UE 902 including an indication of the L selected precoding vectors, and the UE 902 may transmit the PUSCH transmission 942 using the selected precoding vectors. In some aspects, the scheduling restriction indicator 928 may be a SRI capability indicator. In some aspects, where the UE 902 is configured to operate in a 5G communication system, the SRI capability indicator may be included in the UE capability signaling.

FIG. 10 is a table 1000 illustrating SRI combinations and an index field corresponding to each SRI combination. The table 1000 may include one index value corresponding to each possible combination of SRIs. The base station 904 may indicate the selected precoding vectors to the UE 902 by sending bits corresponding to the index value for the SRI or combination of SRIs carrying the selected precoding vectors in the DCI 934. The UE 902 may transmit an SRI capability indicator to the base station 904. In some aspects, the SRI capability indicator may identify which SRIs or combinations of SRIs the base station 904 may not include in the DCI. For example, the UE 902 may transmit an SRI capability indicator to the base station 902 that indicates that the base station 904 cannot select SRI combinations belonging to different antenna groups.

For example, SRI 0 and SRI 1 may correspond to transmissions on first and second SRS resources by a first antenna group and SRI 2 and SRI 3 may correspond to transmissions on third and fourth SRS resources transmitted by a second antenna group, such as illustrated in FIG. 8. The UE 902 may generate and transmit an SRI capability indicator which indicates that the base station 904 cannot select indexes 5-8, corresponding to combinations of SRIs associated with both antenna groups. The base station 904, when selecting the L precoding vectors, may therefore only select individual SRIs, which can only correspond to one antenna group, or a combination of SRIs belonging to the same antenna group (for example indexes 4 or 9).

In some aspects, the SRI capability indicator may identify which SRIs or combinations of SRIs the base station 904 can include in the DCI, and the UE 902 may transmit an SRI capability that only indicates individual SRIs or SRI combinations which use the same antenna group. For example, the UE 902 may generate and transmit an SRI capability indicator which indicates that the base station 904 may select indexes 0-3 corresponding to individual SRIs, index 4 corresponding to a combination of SRI 0 and SRI 1 (the SRIs of the first antenna group transmissions), and index 9 corresponding to a combination of SRI 2 and SRI 3 (the SRIs of the second antenna group transmissions).

In some other aspects, the SRI capability indicator may not identify the individual SRIs and may instead only identify the valid combinations of SRIs, and the base station 904 may select combinations of SRIs indicated in the SRI capability indicator and individual SRIs, regardless of whether the individual SRIs are indicated in the SRI capability indicator. For example, in the example discussed above, the SRI capability indicator would only indicate that index 4 and index 9 were valid. Such aspects may reduce the uplink resources used by the UE 902 to transmit the scheduling restriction indicator 928.

In some aspects, the scheduling restriction indicator 928 may be an SRS compatibility indicator. Two SRS resources may be "compatible" if a UE may use them simultaneously for a PUSCH transmission. The SRS compatibility indicator may indicate to the base station 904 which SRIs correspond to SRS resources carrying precoding vectors that the UE 902 can use simultaneously on a PUSCH transmission. When the base station 904 selects precoding vectors, it may only select combinations of precoding vectors received on SRS resources which the SRS compatibility indicator identifies as compatible.

For example, SRI 0 and SRI 1 may correspond to transmissions on first and second SRS resources by a first antenna group and SRI 2 and SRI 3 may correspond to transmissions on third and fourth SRS resources transmitted by a second antenna group, such as illustrated in FIG. 8. The UE 902 may generate an SRS compatibility indicator that indicates that SRI 0 is compatible with SRI 1 and that SRI 2 is compatible with SRI 3. In some aspects, the UE 902 may generate an SRS compatibility indicator that additionally or alternatively indicates that both SRI 0 and SRI 1 are not compatible with SRI 2 or SRI 3, and that both SRI 2 and SRI 3 are not compatible with either SRI 0 or SRI 1.

The UE 902 may indicate compatible SRS resources based on a pattern. In some aspects, where a UE 902 is configured with four SRS resources, the UE 902 may be able to generate the SRS compatibility indicator with patterns or other indications of 4+0, 3+1, 2+2, or 1+1+1+1. An SRS compatibility indicator with a pattern of 4+0 may indicate that all four of the configured SRS resources are compatible. An SRS compatibility indicator with a pattern of 3+1 may indicate that three of the SRS resources (such as the first three SRS resources) are compatible with one another, but the fourth SRS resource is not. An SRS compatibility indicator with a pattern of 2+2 may indicate that the first and second SRS resources are compatible with each other and that the third and fourth SRS resources are compatible with each other, but the first and second SRS resources are not compatible with the third or fourth SRS resources. An SRS compatibility indicator with a pattern of 1+1+1+1 may indicate that none of the SRS resources are compatible.

In some aspects, the SRS compatibility indicator may indicate the maximum PUSCH rank (or the maximum number of PUSCH layers) supported by the UE 902. For example, an SRS compatibility indicator with a pattern of 4+0 may indicate that the UE 902 supports a maximum PUSCH rank of four, an SRS compatibility indicator with a pattern of 3+1 may indicate that the UE 902 supports a maximum PUSCH rank of three, an SRS compatibility indicator with a pattern of 2+2 may indicate that the UE 902 supports a maximum PUSCH rank of two, and an SRS compatibility indicator with a pattern of 1+1+1+1 may indicate that the UE 902 supports a maximum PUSCH rank of one.

In some aspects, the bit width, or the number of bits, of the portion of the DCI 934 identifying the selected precoding vectors may be based on the SRS compatibility indicator. The number of options available to the base station 904, and therefore the number of SRS resource that the base station may potentially signal to the UE 902 in the DCI 934, may depend on the compatibilities identified in the SRS compatibility indicator. For example, referring to the table 1000 of FIG. 10, if the SRS compatibility indicator indicates that all four SRIs correspond to compatible SRS resources (for example, by indicating a pattern of 4+0), the base station 904 may identify any of indexes 0-9 as the selected precoding vectors. Accordingly, when the SRS compatibility indicator has a pattern of 4+0, the bit width may be four, allowing the base station 904 to select any of the ten valid options. If the SRS compatibility indicator indicates that the first and second SRS resources are compatible with each other and that the third and fourth SRS resources are compatible with each other with a pattern of 2+2, the base station 904 may identify any of indexes 0-4 and 9 as supported by the UE for a PUSCH transmission. Accordingly, when the SRS compatibility indicator has a pattern of 2+2, the bit width may be three, allowing the base station 904 to select any of the six valid options. The base station 904 may transmit the DCI with the bit width corresponding to the received SRS compatibility indicator and the UE 902, having generated the SRS compatibility indicator, may expect DCI identifying the selected precoding vectors with the corresponding bit width without further signaling from the base station 904.

In some aspects, the UE 902 may support multiple patterns for the SRS compatibility indicator. For example, the UE 902 may support both 4+0 and 2+2. In some aspects, the UE 902 may generate the SRS compatibility indicator based on a compatibility setting. For example, in an aspect where the UE 902 supports multiple patterns for the SRS compatibility indicator, the compatibility setting may determine which pattern is used. The base station 904 may configure the compatibility setting, for example in an RRC signaling. For example, the base station 904 may set the compatibility setting based on the cell traffic load, the UE traffic load, or channel condition.

Figure 11:
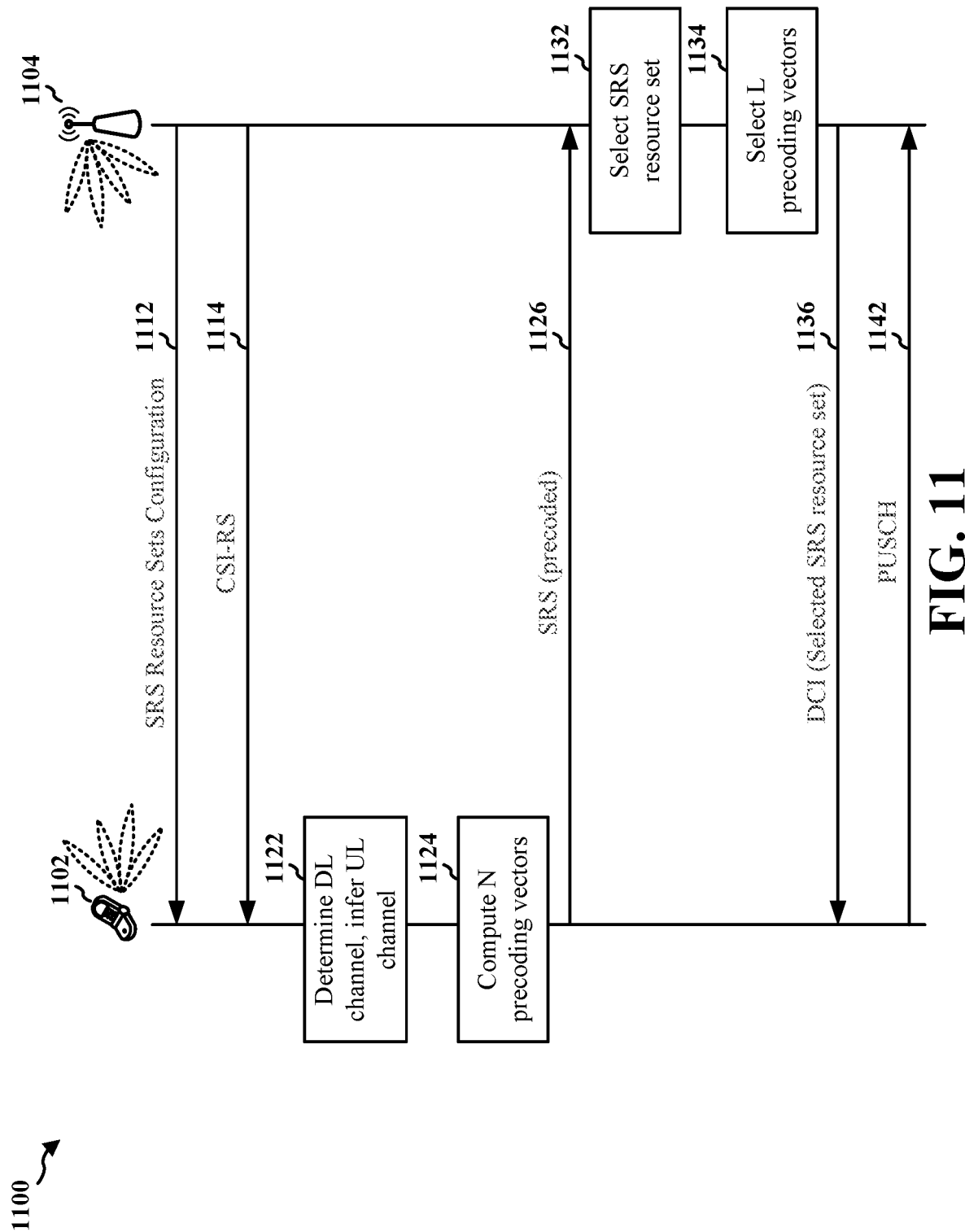
FIG. 11 is a diagram illustrating an example communication flow including non-codebook-based MIMO transmission that supports a base station configuring a UE with multiple SRS resource sets in accordance with aspects of the present disclosure.
Figure 12:
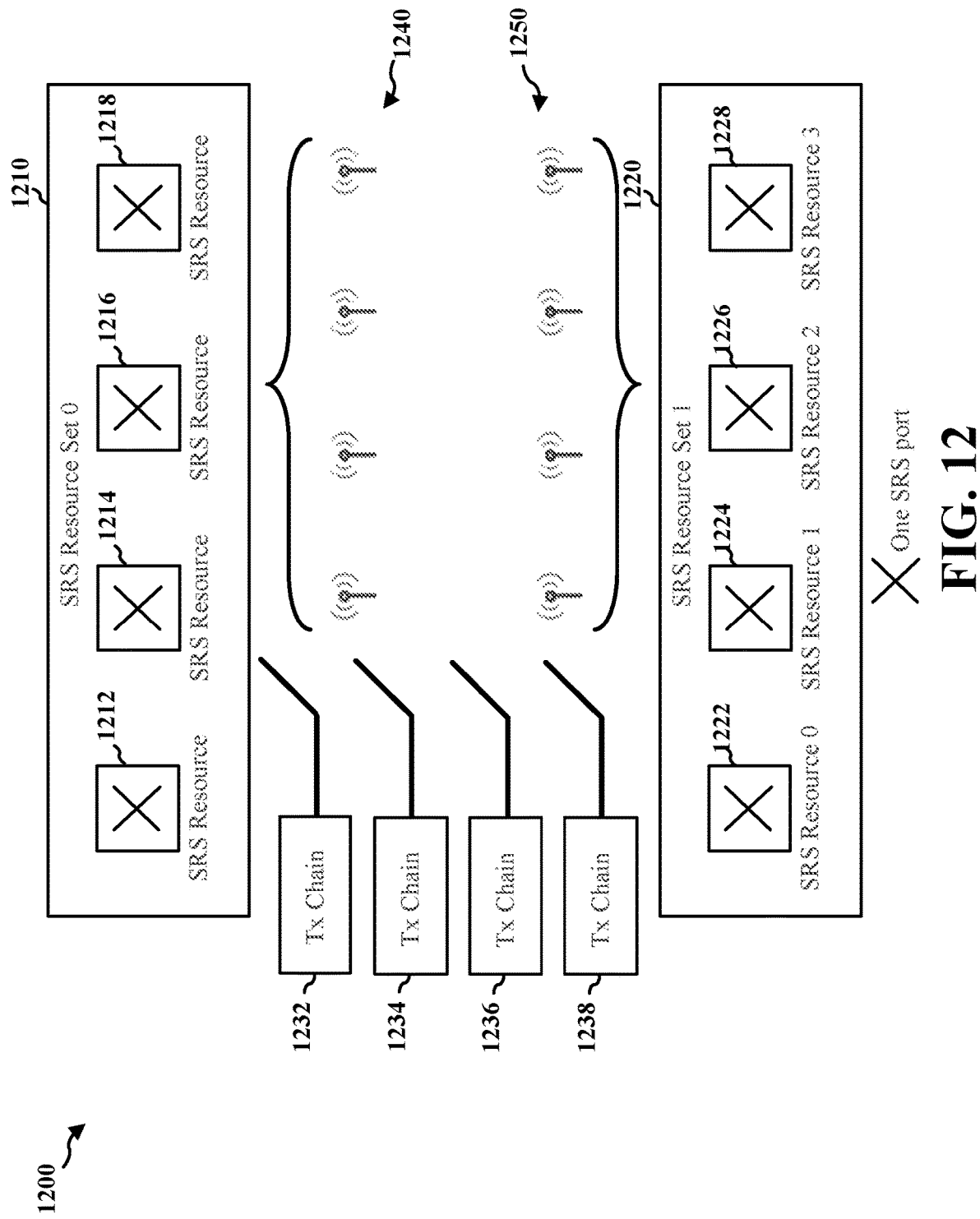
FIG. 12 is a diagram illustrating an example allocation of SRS resources for selecting transmit antennas for an uplink communication in accordance with aspects of the present disclosure.

FIG. 11 is a diagram illustrating an example communication flow 1100 including non-codebook-based MIMO transmission that supports a base station configuring a UE with multiple SRS resource sets. The transmission may be made by a UE 1102 that includes more antennas than transmit chains. For example, the UE 1102 may include eight antennas and four transmit chains. The UE 1102 may transmit an SRS resource sets configuration message 1112 to the UE 1102 to configure the UE 1102 to have multiple resource sets. FIG. 12 is a diagram illustrating an example allocation of SRS resources 1200 for selecting transmit antennas for an uplink communication. The uplink communication may be a non-codebook-based MIMO transmission. The base station 1104 may configure the UE 1102 with multiple SRS resource sets for non-codebook-based PUSCH transmission, such as with the SRS resource sets configuration message 1112. For example, the UE 1102 may be configured with two SRS resource sets: SRS resource set 1210 and SRS resource set 1220. SRS resource set 1210 may include four SRS resources: SRS resource 1212, SRS resource 1214, SRS resource 1216, and SRS resource 1218. SRS resource set 1220 may also include four SRS resources: SRS resource 1222, SRS resource 1224, SRS resource 1226, and SRS resource 1228. Each SRS resource may include one SRS port, and may be used to transmit an SRS precoded with one precoding vector.

The base station 1104 may transmit CSI-RS 1114 to the UE 1102, and the UE 1102 may determine the DL channel and infer the UL channel from the DL channel as illustrated at 1122. This process may be performed as described above with respect to the CSI-RS 514 and block 522 of FIG. 5. The UE 1102 may compute N precoding vectors as illustrated at 1124. Each precoding vector of the N precoding vectors may correspond one of the configured SRS resource sets. In some aspects, if the UE 1102 is configured with two SRS resource sets, the UE 1102 may compute N/2 precoding vectors for each resource set. The UE 1102 may transmit SRSs 1126 precoded with the N precoding vectors to the base station 1104, as illustrated at 1132. The UE 1102 may transmit the precoded SRSs as illustrated in FIG. 12.

The antennas of the UE 1102 can be divided into a first antenna group 1240 and a second antenna group 1250. The transmit chains 1232, 1232, 1236, and 1238 may each transmit on one antenna of the first antenna group 1240 and on one antenna of the second antenna group 1250. Each SRS resource set may correspond to a group of antennas. SRS resource set 1210 may correspond to a first antenna group 1240 and SRS resource set 1220 may correspond to a second antenna group 1250.

The UE 1102 may transmit one SRS precoded with one precoding vector on each SRS resource. For a given SRS resource set, the UE 1102 may only transmit SRSs precoded with precoding vectors that the UE 1102 can use concurrently during a PUSCH transmission. For example, on the SRS resources 1212, 1214, 1216, and 1218 of the SRS resource set 1210, the UE 1102 may transmit SRSs using precoding vectors on the first antenna group 1240. Similarly, on the SRS resources 1222, 1224, 1226, and 1228 of the SRS resource set 1220, the UE 1102 may transmit SRSs using precoding vectors on the second antenna group 1250.

The base station 1104 may receive the SRSs transmitted on the SRS resources of the SRS resource set 1210 and the SRS resource set 1220. The base station 1104 may select one of the received SRS resource sets for the UE 1102 to use for a PUSCH transmission based on the received SRS transmissions on each of the SRS resource sets as illustrated at 1132. For example, base station may measure the signal strength of the SRS transmissions on the first SRS resource set and the second SRS resource set, and select the SRS resource set which provides a higher signal strength. The base station 1104 may also select L precoding vectors as illustrated at 1134. The base station 1104 may select precoding vectors transmitted on SRS resources of the SRS resource set selected at 1132. Because all of the precoding vectors transmitted on SRS resources of a given SRS resource set can be used concurrently by the UE 1102 in a PUSCH transmission, the base station 1104 will select compatible precoding vectors at 1134.

The base station 1104 may transmit DCI 1134 to the UE 1102. The DCI 1134 may include an UL grant and an SRS resource set indicator field. The SRS resource set indicator field may identify the SRS resource set selected by the base station 1104 at 1132. For example, where the UE 1102 is configured with two SRS resource sets, the SRS resource set indicator field may be a single bit. The DCI 1134 may include an SRI field for identifying the SRIs of the SRS resources used to transmit the L selected precoding vectors. In some aspects, the SRI field may not have a separate value for each SRI combination, and may instead work in conjunction with the SRS resource set indicator field. For example, a given value for the SRI field may identify selected precoding vectors corresponding to SRS resources in SRS resource set 1210 if the SRS resource set indicator field is "0", and the same given value for the SRI field may identify precoding vectors corresponding to SRS resources in SRS resource set 1220 if the SRS resource set indicator is "1". Finally, the UE 1102 may utilize the L precoding vectors and the SRS resource set identified in the DCI 1134 in a PUSCH transmission 1142 to the base station 1104.

In some aspects, a UE may be scheduled to transmit multiple PUSCH transmissions concurrently. For example, a UE may communicate with multiple transmit reception points (TRPs) or multiple base stations (for example, using a multiple transmission reception point architecture), and may be scheduled for multiple PUSCH uplink transmissions at the same time. The UE may indicate compatible SRS resources to the base station or base stations scheduling PUSCH transmissions for the UE, for example as described above with respect to FIG. 9. A scheduling base station or base stations may receive the compatible SRS resources. Where the UE indicated multiple compatible resources, the scheduling base station or base stations may schedule the UE for one higher-rank PUSCH or multiple lower-rank PUSCH transmissions on compatible resources. For example, where the UE indicates that a first and a second SRS resource are compatible, the scheduling base station or base stations may schedule the UE for one rank-2 PUSCH, or may schedule the UE for two rank-1 PUSCHs targeted to two separate TRPs or base stations. Where the UE indicates that resources are not compatible, in addition to not scheduling a single PUSCH using the incompatible resources as discussed above, the scheduling base station or scheduling base stations may not schedule rank-1 PUSCHs to separate TRPs or separate base stations using incompatible SRS resources. As a result, the scheduling base station or base stations may not schedule rank-1 PUSCHs to separate TRPs or separate base stations using precoding vectors associated with incompatible SRS resources.

Figure 13:
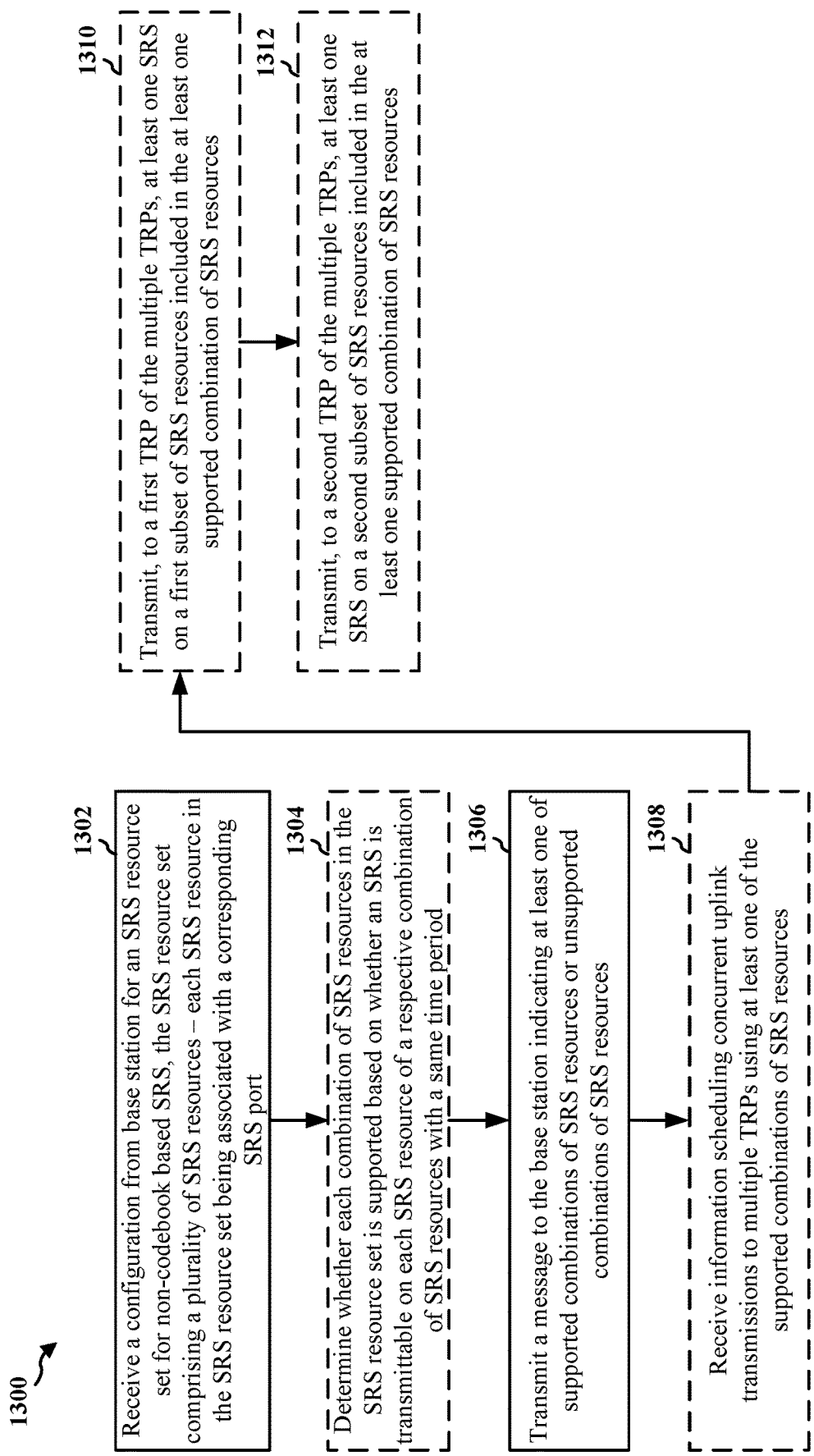
FIG. 13 is a flowchart illustrating a process for wireless communication that supports the indication of supported or unsupported combinations of SRS resources by a UE in accordance with some aspects of the present disclosure.

FIG. 13 is a flowchart illustrating a process 1300 for wireless communication. The method may be performed by a UE (such as the UE 104, 350, 502, 902, 1102; the apparatus 1502; the processing system 1614, which may include the memory 360 and which may be the entire UE 350 or a component of the UE 350, such as the TX processor 368, the RX processor 356, or the controller/processor 359). The method may enable a UE having more antennas than transmit chains to provide information that helps a base station to avoid scheduling the UE based on incompatible SRS resources.

At 1302, the UE receives a configuration from a base station for an SRS resource set for non-codebook-based SRS. The SRS resource set includes a plurality of SRS resources, where each SRS resource in the SRS resource set is associated with a corresponding SRS port. The reception of the configured SRS resource set may be performed by the SRS resource set component 1508 of the apparatus 1502 in FIG. 15.

Figure 15:
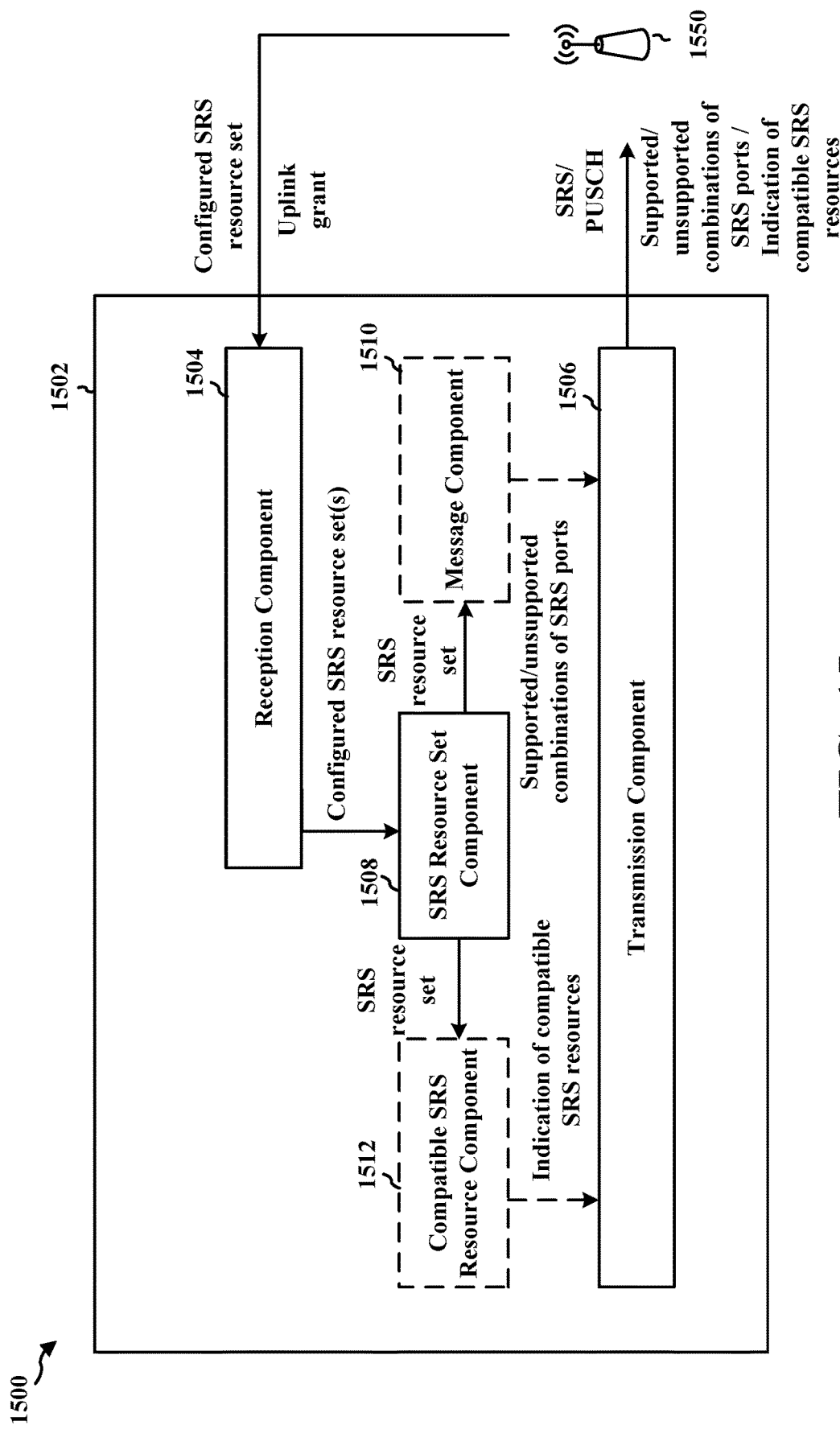
FIG. 15 is a conceptual data flow diagram illustrating the data flow between different components in an example apparatus in accordance with some aspects of the present disclosure.

At 1304, the UE may determine whether each combination of SRS resources in the SRS resource set is supported based on whether an SRS is transmittable on each SRS resource of a respective combination of SRS resources with a same time period. For example, the UE may determine whether the UE is able to transmit an SRS on each SRS resource of the respective combination of SRS resources with the same time period—e.g., the same time period may be a same symbol, same slot, or other contemporaneous duration. The UE may then determine that a respective combination of SRS resources in the SRS resource set is supported when the UE is able to transmit an SRS on each SRS resource of the respective combination of SRS resources with the same time period, but may determine that a respective combination of SRS resources in the SRS resource set is unsupported when the UE is unable to transmit an SRS on each SRS resource of the respective combination of SRS resources with the same time period. In the context of FIG. 15, for example, the determination of whether each combination of SRS resources in the SRS resource set is supported based on whether an SRS is transmittable on each SRS resource of a respective combination of SRS resources with a same time period may be performed by the compatible SRS resource component 1512 of the apparatus 1502 in FIG. 15.

In some aspects, the UE may further determine the one or more supported combinations of SRS resources or the one or more unsupported combinations of SRS resources based on the determination of whether each combination of SRS resources in the SRS resource set is supported. For example, the UE may determine to include a combination of SRS resources in the one or more supported combinations of SRS resources when an SRS is concurrently transmittable on each SRS resource of the combination of SRS resources; however, the UE may determine to include another combination of SRS resources in the one or more unsupported combinations of SRS resources when an SRS is not concurrently transmittable on each SRS resource of the other combination of SRS resources. In the context of FIG. 15, for example, the determination of the one or more supported combinations of SRS resources or the one or more unsupported combinations of SRS resources based on the determination of whether each combination of SRS resources in the SRS resource set is supported may be performed by the compatible SRS resource component 1512 of the apparatus 1502 in FIG. 15.

At 1306, the UE transmits a message to the base station indicating one or more supported combinations of SRS resources or one or more unsupported combinations of SRS resources, or both supported and unsupported combinations of SRS resources. The message may be transmitted by the message component 1510 of the apparatus 1502 in FIG. 15. The message may include a UE capability message, such as described in connection with FIG. 9. Each combination of SRS resources in the SRS resource set may have a corresponding SRI, and the transmission of the message, at 1306, includes transmitting an indication of a subset of SRIs that are not supported by the UE. In some implementations, the UE may transmit the indication for SRIs associated with rank two or higher—e.g., SRIs corresponding to SRS resources that are rank two or higher.

In some aspects, at least one of the one or more supported combinations of SRS resources and/or the one or more unsupported combinations of SRS resources may be based on the determination of whether each combination of SRS resources in the SRS resource set is supported, as described at 1304.

The UE may further receive an SRI from the base station scheduling uplink transmissions based on the supported combinations of SRS resources and may transmit a PUSCH to the base station based on the SRI, as described in connection with at least FIG. 9.

At 1308, the UE may receive information scheduling concurrent uplink transmissions to multiple TRPs using at least one of the supported combinations of SRS resources. The information may be received from the base station. In the context of FIG. 15, for example, the reception of the information scheduling concurrent uplink transmissions to multiple TRPs using at least one of the supported combinations of SRS resources may be performed by the reception component 1504 of the apparatus 1502 in FIG. 15.

At 1310, the UE may transmit, to a first TRP of the multiple TRPs, at least one SRS on a first subset of SRS resources included in the at least one supported combination of SRS resources based on the information scheduling the concurrent uplink transmissions. In the context of FIG. 15, for example, the transmission, to the first TRP of the multiple TRPs, of at least one SRS on a first subset of SRS resources included in the at least one supported combination of SRS resources based on the information scheduling the concurrent uplink transmissions may be performed by the transmission component 1506 of the apparatus 1502 in FIG. 15.

At 1312, the UE may transmit, to a second TRP of the multiple TRPs, at least one SRS on a second subset of SRS resources included in the at least one supported combination of SRS resources based on the information scheduling the concurrent uplink transmissions. In some aspects, the first subset of SRS resources is different from the second subset of SRS resources—e.g., the first subset of SRS resources and the second subset of SRS resources may be mutually exclusive; that is, all of the SRS resources in the first subset may be different from those in the second subset. In some aspects, the at least one SRS on the first subset of SRS resources may be concurrently transmitted with the at least one SRS on the second subset of SRS resources. For example, the UE may transmit one or more SRS(s) on the first subset of SRS resources at the same time (e.g., same symbol, same slot, another concurrent and/or at least partially overlapping time period, etc.) as the UE transmits one or more SRS(s) on the second subset of SRS resources. In the context of FIG. 15, for example, the transmission, to the second TRP of the multiple TRPs, of at least one SRS on a second subset of SRS resources included in the at least one supported combination of SRS resources based on the information scheduling the concurrent uplink transmissions may be performed by the transmission component 1506 of the apparatus 1502 in FIG. 15.

Figure 14:
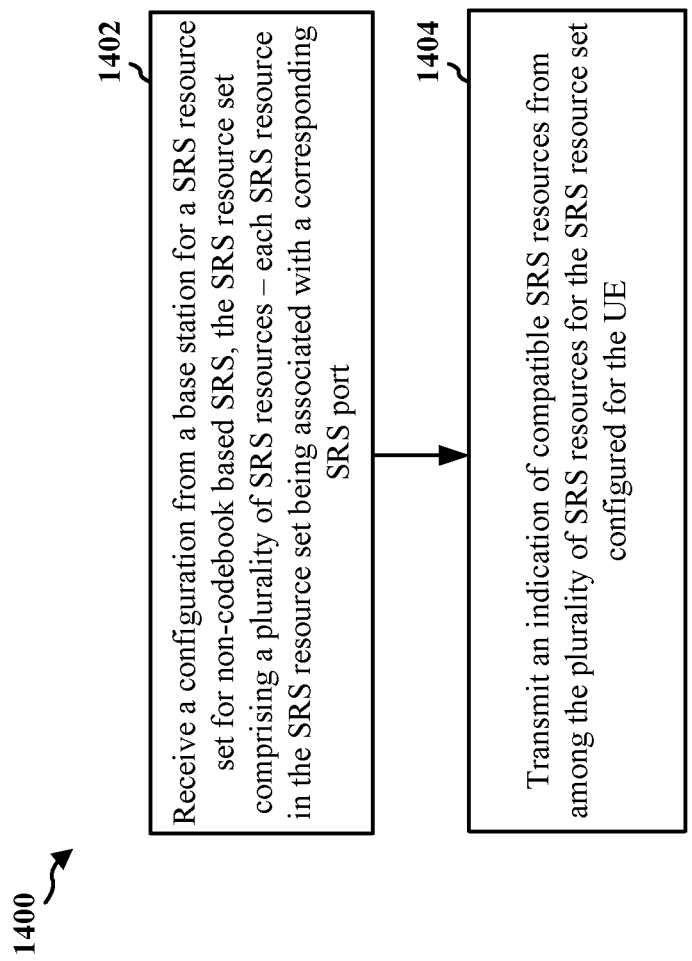
FIG. 14 is a flowchart illustrating a process for wireless communication that supports the indication of compatible SRS resources by a UE in accordance with some aspects of the present disclosure.

FIG. 14 is a flowchart illustrating a process 1400 for wireless communication. The method may be performed by a UE (such as the UE 104, 350, 502, 902, 1102; the apparatus 1502; the processing system 1614, which may include the memory 360 and which may be the entire UE 350 or a component of the UE 350, such as the TX processor 368, the RX processor 356, or the controller/processor 359). The method may enable a UE having more antennas than transmit chains to provide information that helps a base station to avoid scheduling the UE based on incompatible SRS resources.

At 1402, the UE receives a configuration from a base station for an SRS resource set for non-codebook-based SRS. The SRS resource set includes a plurality of SRS resources, where each SRS resource in the SRS resource set is associated with a corresponding SRS port. The reception of the configured SRS resource set may be performed by the SRS resource set component 1508 of the apparatus 1502 in FIG. 15.

At 1404, the UE transmits an indication of compatible SRS resources from among the plurality of SRS resources for the SRS resource set configured for the UE. The indication may include a UE capability indication such as described in connection with FIG. 9. The transmission of the indication may be performed, for example, by the compatible SRS resource component 1512 of the apparatus 1502 in FIG. 15. The compatible SRS resources may include SRS resources that can be used concurrently on a PUSCH transmission by the UE. The indication of compatible SRS resources may include a compatibility pattern of the plurality of SRS resources of the SRS resource set configured for the UE. For example, a pattern of 4+0 may indicate that four SRS resource sets are compatible. A pattern of 3+1 may indicate that the first three SRS resource sets are compatible, and a fourth is not compatible. A pattern of 2+2 may indicate that a first two SRS resources sets are compatible, and the third and fourth SRS resource sets are compatible. A pattern of 1+1+1+1 may indicate that none of the SRS resource sets are compatible.

The UE may further receive an SRI from the base station scheduling uplink transmissions based on the indication of compatible SRS resources, as described in connection with at least FIG. 9. A bit width of the SRI may be based on a number of compatible SRS resources indicated by the UE. For a smaller number of compatible SRS resources, the base station may be able to indicate a particular SRS resource using fewer bits. The UE may transmit the PUSCH to the base station based on the SRI.

FIG. 15 is a conceptual data flow diagram illustrating the data flow 1500 between different components in an example apparatus 1502. The apparatus may be a UE or a component of a UE. The apparatus 1502 includes an SRS resource set component 1508 that receives a configuration from a base station 1550 (for example, through reception component 1504) for a SRS resource set for non-codebook-based SRS, such as described in connection with 1302 of FIG. 13 or 1402 of FIG. 14. The SRS resource set received by the SRS resource set component 1508 may include a plurality of SRS resources, where each SRS resource in the SRS resource set is associated with a corresponding SRS port. In some aspects, the apparatus 1502 includes a message component 1510 that receives the SRS resource set from the SRS resource set component 1508 and transmits a message to the base station 1550 (for example, through transmission component 1506) indicating at least one of supported combinations of SRS resources or unsupported combinations of SRS resources, such as described in connection with 1306 of FIG. 13. In some aspects, the apparatus 1502 includes a compatible SRS resource component 1512 that receives the SRS resource set from the STS resource set component 1508 and transmits an indication of compatible SRS resources from among the plurality of SRS resources configured for the apparatus 1502 to the base station 1550 (for example, through the transmission component 1506), such as described in connection with 1404 of FIG. 14.

The apparatus 1502 may include additional components that perform each of the blocks of the algorithm in the aforementioned flowcharts of FIGS. 13 and 14. As such, each block in the aforementioned flowcharts of FIGS. 13 and 14 may be performed by a component and the apparatus 1502 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 16:
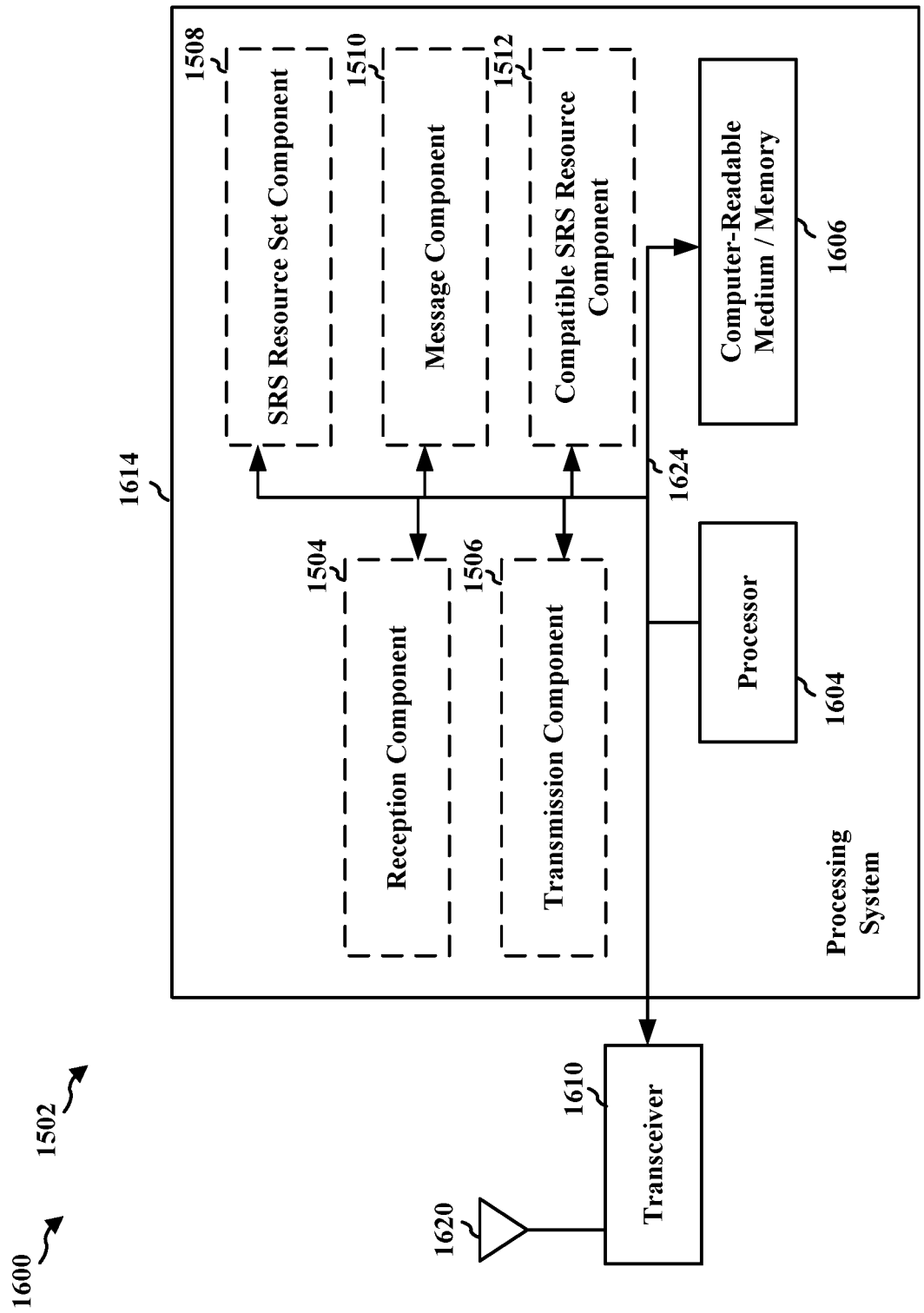
FIG. 16 is a diagram illustrating an example of a hardware implementation for an apparatus employing a processing system in accordance with some aspects of the present disclosure.

FIG. 16 is a diagram illustrating an example of a hardware implementation 1600 for an apparatus 1502 employing a processing system 1614. The processing system 1614 may be implemented with a bus architecture, represented generally by the bus 1624. The bus 1624 may include any number of interconnecting buses and bridges depending on the specific application of the processing system 1614 and the overall design constraints. The bus 1624 links together various circuits including one or more processors or hardware components, represented by the processor 1604, the components 1504, 1506, 1508, 1510, 1512, and the computer-readable medium/memory 1606. The bus 1624 may also link various other circuits such as timing sources, peripherals, voltage regulators, and power management circuits.

The processing system 1614 may be coupled to a transceiver 1610. The transceiver 1610 is coupled to one or more antennas 1620. The transceiver 1610 provides a means for communicating with various other apparatus over a transmission medium. The transceiver 1610 receives a signal from the one or more antennas 1620, extracts information from the received signal, and provides the extracted information to the processing system 1614, specifically the reception component 1504. In addition, the transceiver 1610 receives information from the processing system 1614, specifically the transmission component 1506, and based on the received information, generates a signal to be applied to the one or more antennas 1620. The processing system 1614 includes a processor 1604 coupled to a computer-readable medium/memory 1606. The processor 1604 is responsible for general processing, including the execution of software stored on the computer-readable medium/memory 1606. The software, when executed by the processor 1604, causes the processing system 1614 to perform the various functions described herein for any particular apparatus. The computer-readable medium/memory 1606 may also be used for storing data that is manipulated by the processor 1604 when executing software. The processing system 1614 further includes at least one of the components 1504, 1506, 1508, 1510, 1512. The components may be software components running in the processor 1604, resident/stored in the computer readable medium/memory 1606, one or more hardware components coupled to the processor 1604, or some combination thereof. The processing system 1614 may be a component of the UE 350 and may include the memory 360 or at least one of the TX processor 368, the RX processor 356, and the controller/processor 359. Alternatively, the processing system 1614 may be the entire UE (such as see 350 of FIG. 3).

In one configuration, the apparatus 1502 for wireless communication includes means for receiving a configuration from a base station for a sounding reference signal (SRS) resource set for non-codebook-based SRS, the SRS resource set comprising a plurality of SRS resources, wherein each SRS resource in the SRS resource set is associated with a corresponding SRS port. In one configuration, the apparatus 1502 for wireless communication includes means for transmitting a message to the base station indicating at least one of supported combinations of SRS resources or unsupported combinations of SRS resources. In one configuration, the apparatus 1502 for wireless communication includes means for transmitting an indication of compatible SRS resources from among the plurality of SRS resources for the SRS resource set configured for the apparatus 1502. The aforementioned means may be one or more of the aforementioned components of the apparatus 1502 or the processing system 1614 of the apparatus 1502 configured to perform the functions recited by the aforementioned means. As described herein, the processing system 1614 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 17:
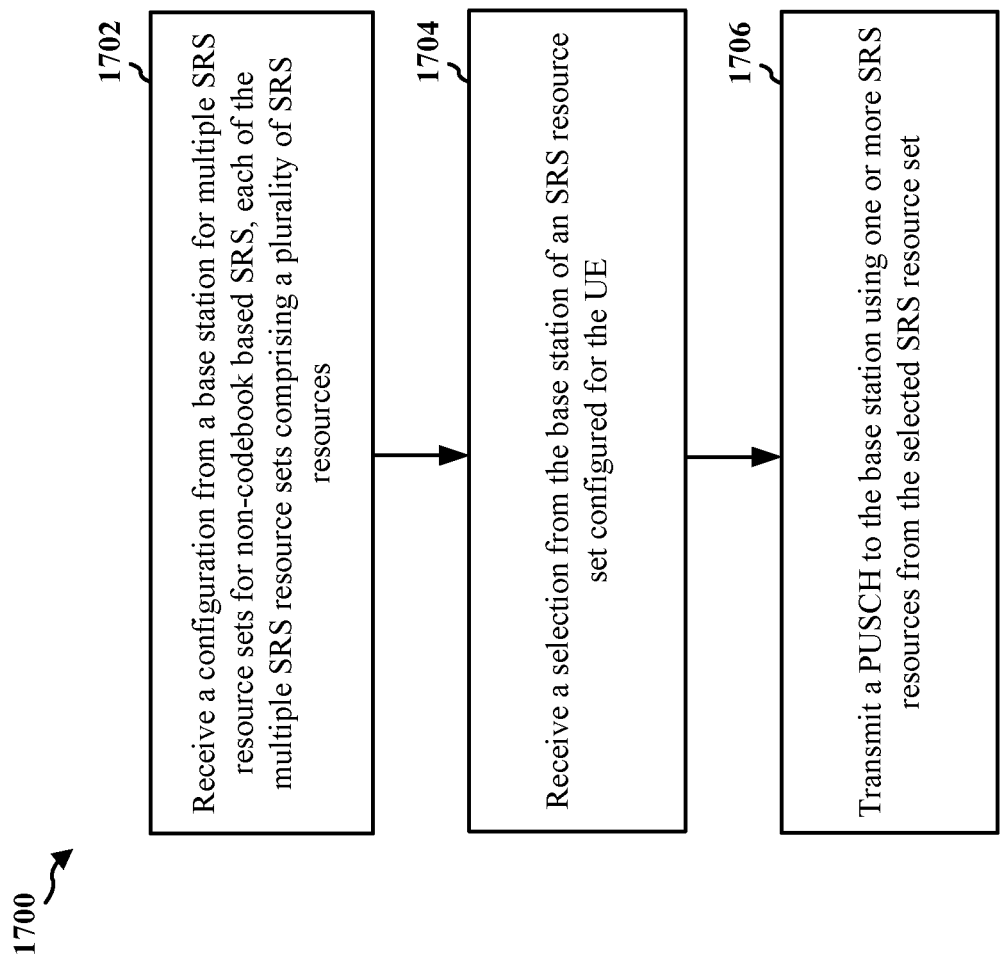
FIG. 17 is a flowchart illustrating a process for wireless communication that supports a configuration of a UE with multiple SRS resources sets in accordance with some aspects of the present disclosure.

FIG. 17 is a flowchart illustrating a process 1700 for wireless communication. The method may be performed by a UE (such as the UE 104, 350, 502, 902, 1102; the apparatus 1802; the processing system 1914, which may include the memory 360 and which may be the entire UE 350 or a component of the UE 350, such as the TX processor 368, the RX processor 356, or the controller/processor 359).

At 1702, the UE receives a configuration from a base station for multiple SRS resource sets for non-codebook-based SRS. For example, the UE may receive a configuration for two SRS resource sets, such as described in connection with FIG. 11. The SRS resource sets may each include a plurality of SRS resources. The reception of the configured SRS resource set may be performed by the SRS resource set component 1808 of the apparatus 1802 in FIG. 18.

At 1704, the UE receives a selection from the base station of an SRS resource set configured for the UE. The reception of the selection may be performed, for example, by the selected SRS resource set component 1810 of the apparatus 1802 in FIG. 18. The UE may receive the selection of the SRS resource set from the base station in an uplink grant associated with the PUSCH transmission. The UE may further determine compatible SRS ports corresponding to the plurality of SRS resources included in a corresponding SRS resource set. The compatible SRS ports may include SRS ports that can be used concurrently on a PUSCH transmission by the UE.

At 1706, the UE transmits a PUSCH to the base station using one or more SRS resources from the selected SRS resource set. The transmission of the PUSCH may be performed, for example, by the PUSCH component 1812 of the apparatus 1802 in FIG. 18.

Figure 18:
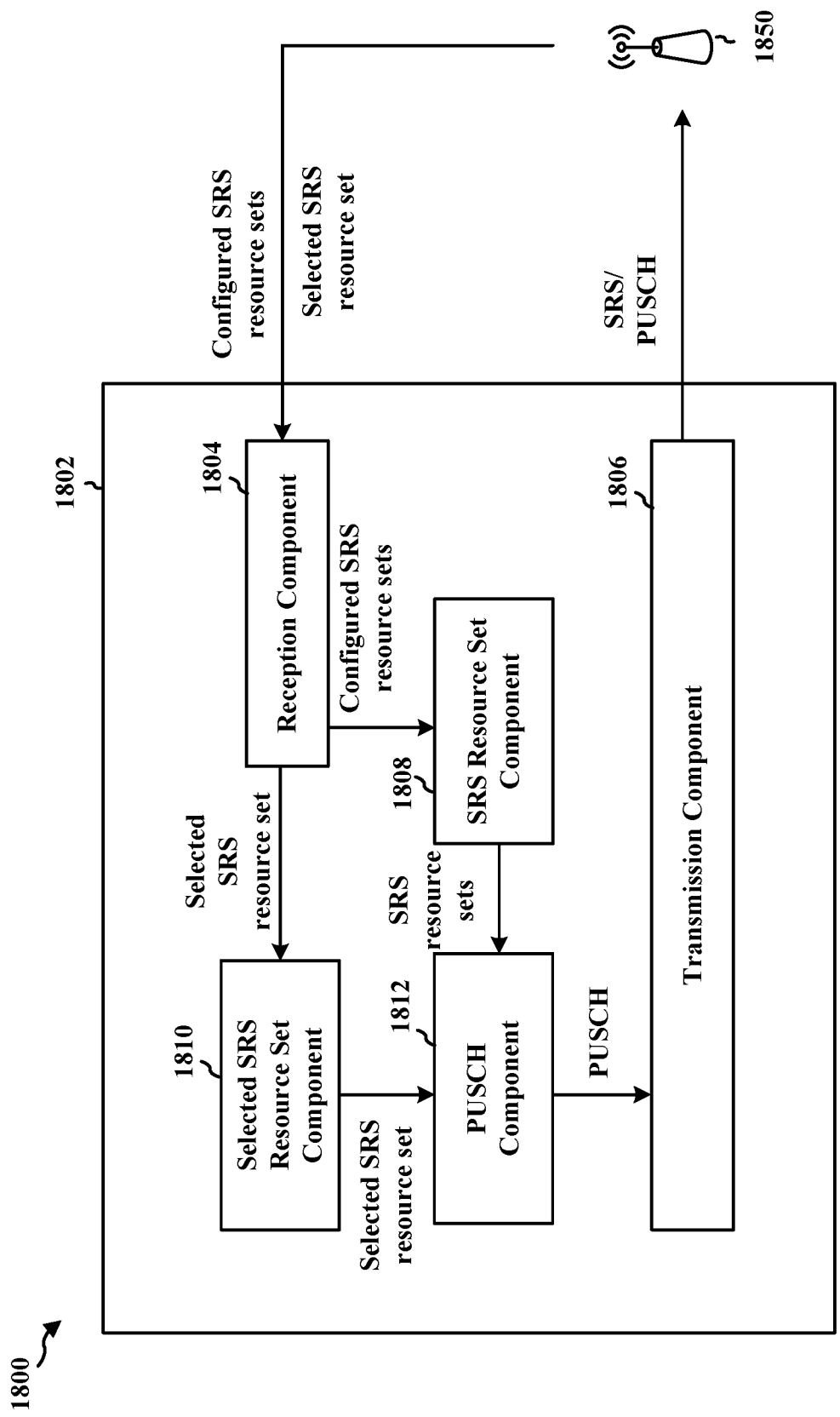
FIG. 18 is a conceptual data flow diagram illustrating the data flow between different components in an example apparatus in accordance with some aspects of the present disclosure.

FIG. 18 is a conceptual data flow diagram illustrating the data flow 1800 between different means/components in an example apparatus 1802. The apparatus may be a UE or a component of a UE. The apparatus 1802 includes a SRS resource set component 1808 that receives (such as through a reception component 1804) a configuration from a base station 1850 for multiple SRS resource sets for non-codebook-based SRS, each of the multiple SRS resource sets including a plurality of SRS resources, such as described in connection with 1702 of FIG. 17. The apparatus 1802 further includes a selected SRS resource set component 1810 that receives (such as through the reception component 1804) a selection from the base station 1850 of an SRS resource set configured for the apparatus 1802, such as described in connection with 1704 of FIG. 17. The apparatus 1802 also includes a PUSCH component 1812 that receives the SRS resource sets from the STS resource set component 1808 and receives the selected SRS resource set from the selected SRS resource set component 1810 and transmits a PUSCH to the base station using one or more SRS resources from the selected SRS resource set, such as described in connection with 1706 of FIG. 17.

The apparatus 1802 may include additional components that perform each of the blocks of the algorithm in the aforementioned flowchart of FIG. 17. As such, each block in the aforementioned flowchart of FIG. 17 may be performed by a component and the apparatus 1802 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 19:
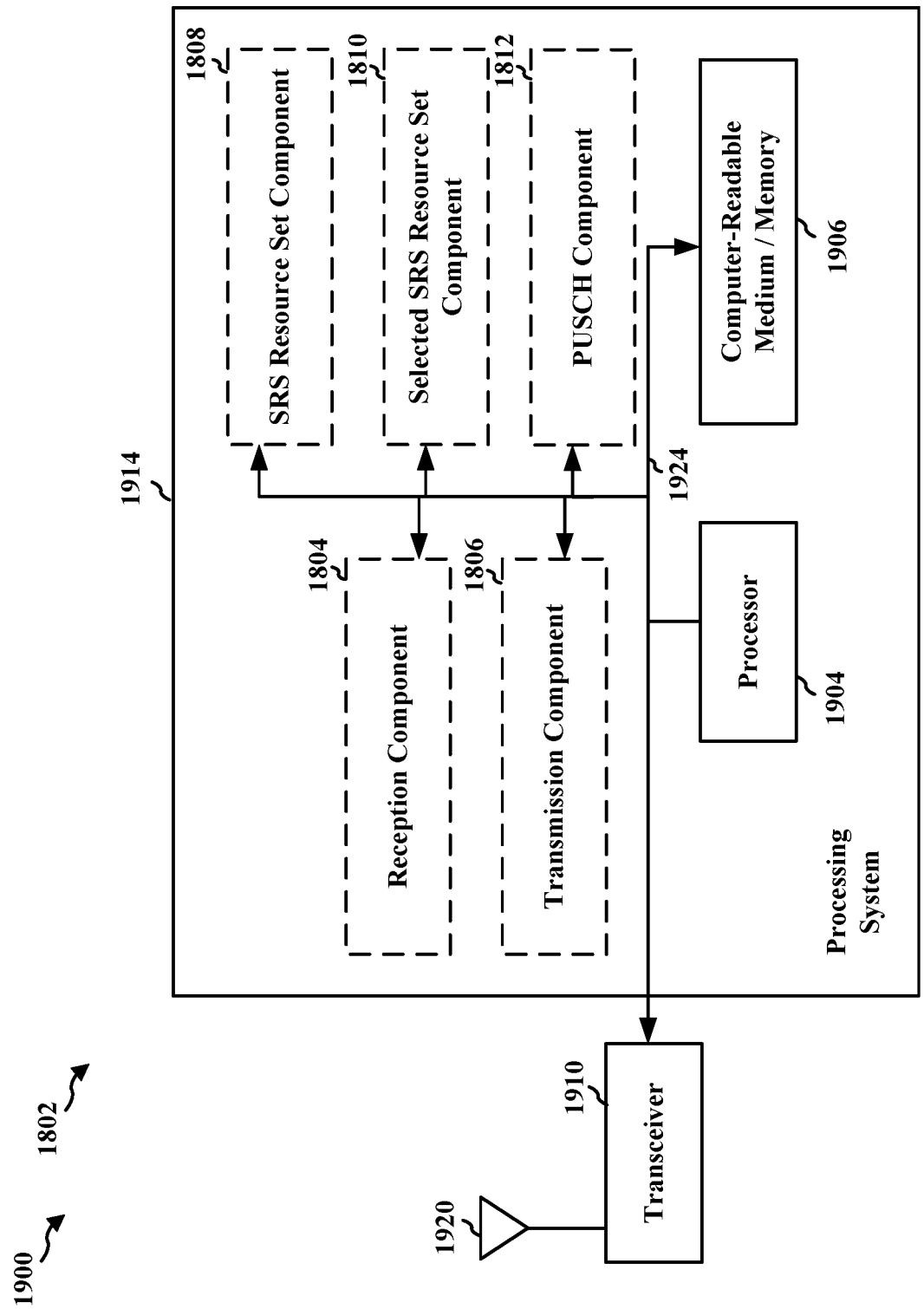
FIG. 19 is a diagram illustrating an example of a hardware implementation for an apparatus employing a processing system in accordance with some aspects of the present disclosure.

FIG. 19 is a diagram illustrating an example of a hardware implementation 1900 for an apparatus 1802 employing a processing system 1914. The processing system 1914 may be implemented with a bus architecture, represented generally by the bus 1924. The bus 1924 may include any number of interconnecting buses and bridges depending on the specific application of the processing system 1914 and the overall design constraints. The bus 1924 links together various circuits including one or more processors or hardware components, represented by the processor 1904, the components 1804, 1806, 1808, 1810, 1812, and the computer-readable medium/memory 1906. The bus 1924 may also link various other circuits such as timing sources, peripherals, voltage regulators, and power management circuits.

The processing system 1914 may be coupled to a transceiver 1910. The transceiver 1910 is coupled to one or more antennas 1920. The transceiver 1910 provides a means for communicating with various other apparatus over a transmission medium. The transceiver 1910 receives a signal from the one or more antennas 1920, extracts information from the received signal, and provides the extracted information to the processing system 1914, specifically the reception component 1804. In addition, the transceiver 1910 receives information from the processing system 1914, specifically the transmission component 1806, and based on the received information, generates a signal to be applied to the one or more antennas 1920. The processing system 1914 includes a processor 1904 coupled to a computer-readable medium/memory 1906. The processor 1904 is responsible for general processing, including the execution of software stored on the computer-readable medium/memory 1906. The software, when executed by the processor 1904, causes the processing system 1914 to perform the various functions described herein for any particular apparatus. The computer-readable medium/memory 1906 may also be used for storing data that is manipulated by the processor 1904 when executing software. The processing system 1914 further includes at least one of the components 1804, 1806, 1808, 1810, 1812. The components may be software components running in the processor 1904, resident/stored in the computer readable medium/memory 1906, one or more hardware components coupled to the processor 1904, or some combination thereof. The processing system 1914 may be a component of the UE 350 and may include the memory 360 or at least one of the TX processor 368, the RX processor 356, and the controller/processor 359. Alternatively, the processing system 1914 may be the entire UE (such as see 350 of FIG. 3).

In one configuration, the apparatus 1802 for wireless communication includes means for receiving a configuration from a base station for multiple sounding reference signal (SRS) resource sets for non-codebook-based SRS, each of the multiple SRS resource sets including a plurality of SRS resources. In one configuration, the apparatus 1802 for wireless communication includes means for receiving a selection from the base station of an SRS resource set configured for the apparatus 1802. In one configuration, the apparatus 1802 for wireless communication includes means for transmitting PUSCH to the base station using one or more SRS resources from the selected SRS resource set. The aforementioned means may be one or more of the aforementioned components of the apparatus 1802 or the processing system 1914 of the apparatus 1802 configured to perform the functions recited by the aforementioned means. As described herein, the processing system 1914 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 20:
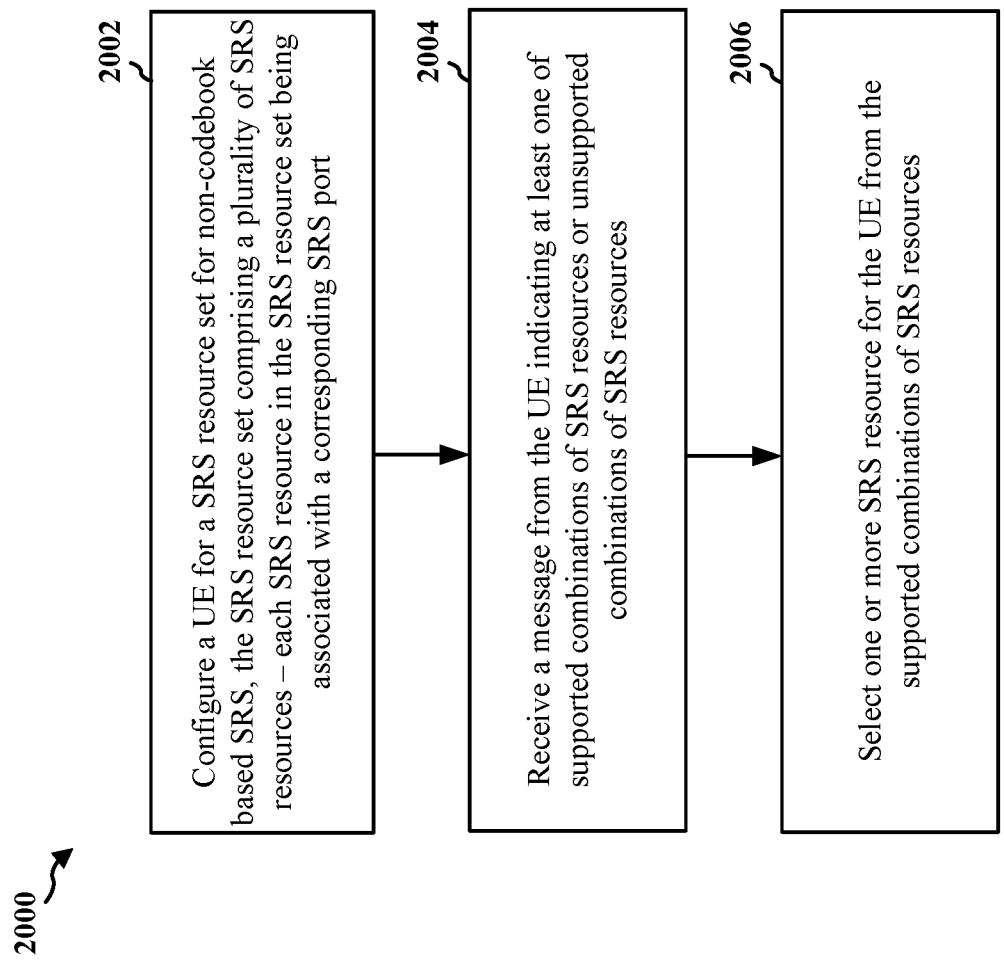
FIG. 20 is a flowchart illustrating a process for wireless communication that supports the selection of SRS resources based on an indication of supported or unsupported combinations of SRS resources from a UE in accordance with some aspects of the present disclosure.

FIG. 20 is a flowchart illustrating a process 2000 for wireless communication. The method may be performed by a base station or a component of a base station (such as the base station 102, 180, 310, 504, 904, 1104; the apparatus 2202; the processing system 2314, which may include the memory 376 and which may be the entire base station 310 or a component of the base station 310, such as the TX processor 316, the RX processor 370, or the controller/processor 375). The method may enable a base station to avoid scheduling a UE based on incompatible SRS resources.

At 2002, the base station configures a UE for an SRS resource set for non-codebook-based SRS. The SRS resource set includes a plurality of SRS resources, where each SRS resource in the SRS resource set is associated with a corresponding SRS port. The configuration may be performed, for example, by the SRS resource set component 2208 of the apparatus 2202 in FIG. 22.

At 2004, the base station receives a message from the UE indicating at least one of supported combinations of SRS resources or unsupported combinations of SRS resources. The message may be received, for example by the message component 2210 of the apparatus 2202 in FIG. 22. The message may provide information, such as described in connection with FIG. 9.

At 2006, the base station selects one or more SRS resource for the UE from the supported combinations of SRS resources. The selection may be performed, for example, by the selection component 2212 of the apparatus 2202 in FIG. 22. The message from the UE may include a UE capability message. Each combination of SRS resources in the SRS resource set may have a corresponding SRI, and the message may include an indication of a subset of SRIs that are not supported by the UE. Each combination of SRS resources in the SRS resource set may have a corresponding SRI, and the message may include an indication of a subset of SRIs that are supported by the UE. The base station may receive the indication for SRIs associated with rank two or higher—e.g., SRIs corresponding to SRS resources, with the SRS resources being rank two or higher.

The base station may further transmit an SRI to the UE scheduling uplink transmissions based on the selected one or more SRS resource and may receive a PUSCH transmission from the UE based on the SRI. In some examples, the base station may schedule concurrent uplink transmissions for the UE to multiple TRPs using the supported combinations of SRS resources.

Figure 21:
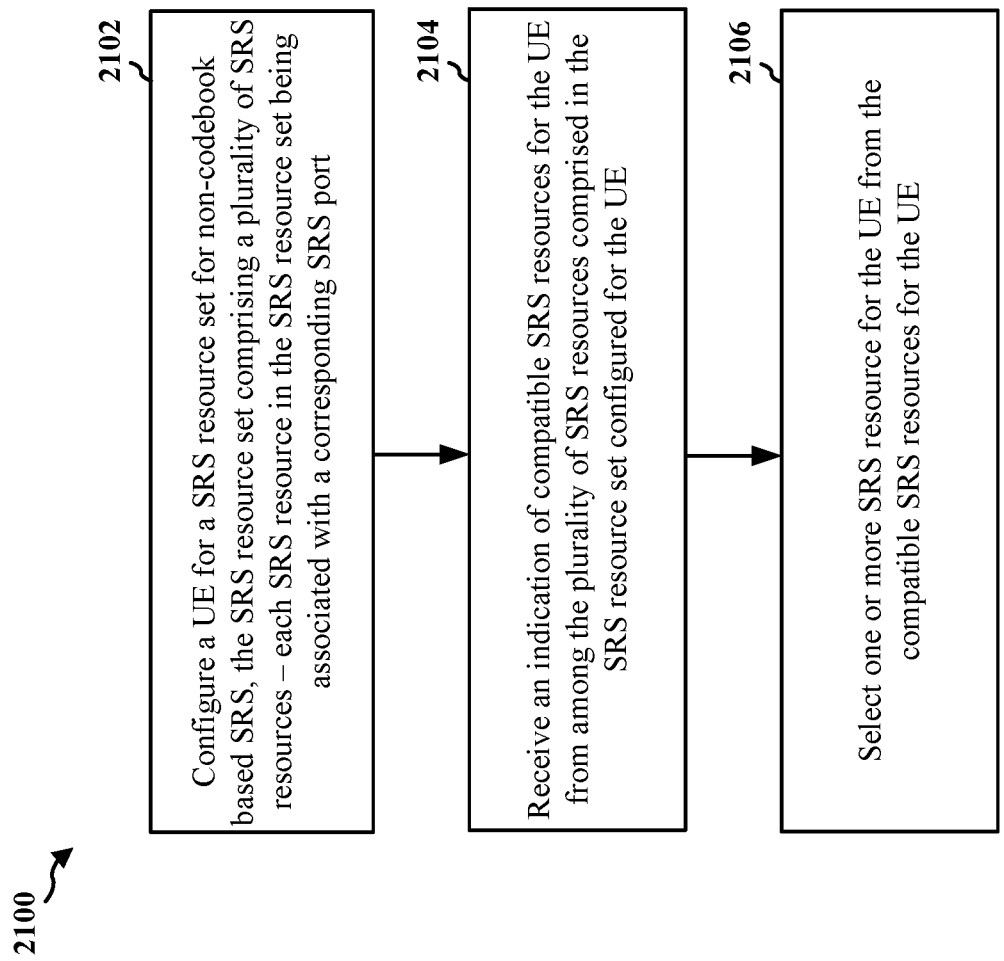
FIG. 21 is a flowchart illustrating a process for wireless communication that supports the selection of SRS resources based on an indication of compatible SRS resources from a UE in accordance with some aspects of the present disclosure.

FIG. 21 is a flowchart illustrating a process 2100 for wireless communication. The method may be performed by a base station or a component of a base station (such as the base station 102, 180, 310, 504, 904, 1104; the apparatus 2202; the processing system 2314, which may include the memory 376 and which may be the entire base station 310 or a component of the base station 310, such as the TX processor 316, the RX processor 370, or the controller/processor 375). The method may enable a base station to avoid scheduling a UE based on incompatible SRS resources.

At 2102, the base station configures a UE for an SRS resource set for non-codebook-based SRS. The SRS resource set includes a plurality of SRS resources, where each SRS resource in the SRS resource set is associated with a corresponding SRS port. The configuration may be performed, for example, by the SRS resource set component 2208 of the apparatus 2202 in FIG. 22.

At 2104, the base station receives an indication of compatible SRS resources for the UE from among the plurality of SRS resources included in the SRS resource set configured for the UE. The indication may be received, for example by the compatible SRS resource component 2214 of the apparatus 2202 in FIG. 22. The indication may provide information, such as described in connection with FIG. 9. The indication may include a UE capability indication. The compatible SRS resources may include SRS resources that can be used concurrently on a PUSCH transmission by the UE. The indication of compatible SRS resources may include a compatibility pattern of the plurality of SRS resources of the SRS resource set configured for the UE. For example, a pattern of 4+0 may indicate that four SRS resource sets are compatible. A pattern of 3+1 may indicate that the first three SRS resource sets are compatible, and a fourth is not compatible. A pattern of 2+2 may indicate that a first two SRS resources sets are compatible, and the third and fourth SRS resource sets are compatible. A pattern of 1+1+1+1 may indicate that none of the SRS resource sets are compatible.

At 2106, the base station selects one or more SRS resource for the UE from the compatible SRS resources for the UE. The selection may be performed, for example, by the selection component 2212 of the apparatus 2202 in FIG. 22. The base station may avoid scheduling a PUSCH transmission using incompatible SRS resources for the UE.

The base station may further transmit an SRI to the UE scheduling uplink transmissions based on the selected one or more SRS resource. A bit width of the SRI may be based on a number of compatible SRS resources indicated by the UE. For example, the base station may use a smaller number of bits to indicate the selected SRS resource(s) when the number of compatible SRS resources is smaller. The base station may then receive a PUSCH a from the UE based on the SRI. When scheduling concurrent uplink transmissions for the UE to multiple TRPs, the base station may use the compatible SRS resources for the UE and may avoid scheduling the UE to transmit the PUSCH using incompatible SRS resources.

Figure 22:
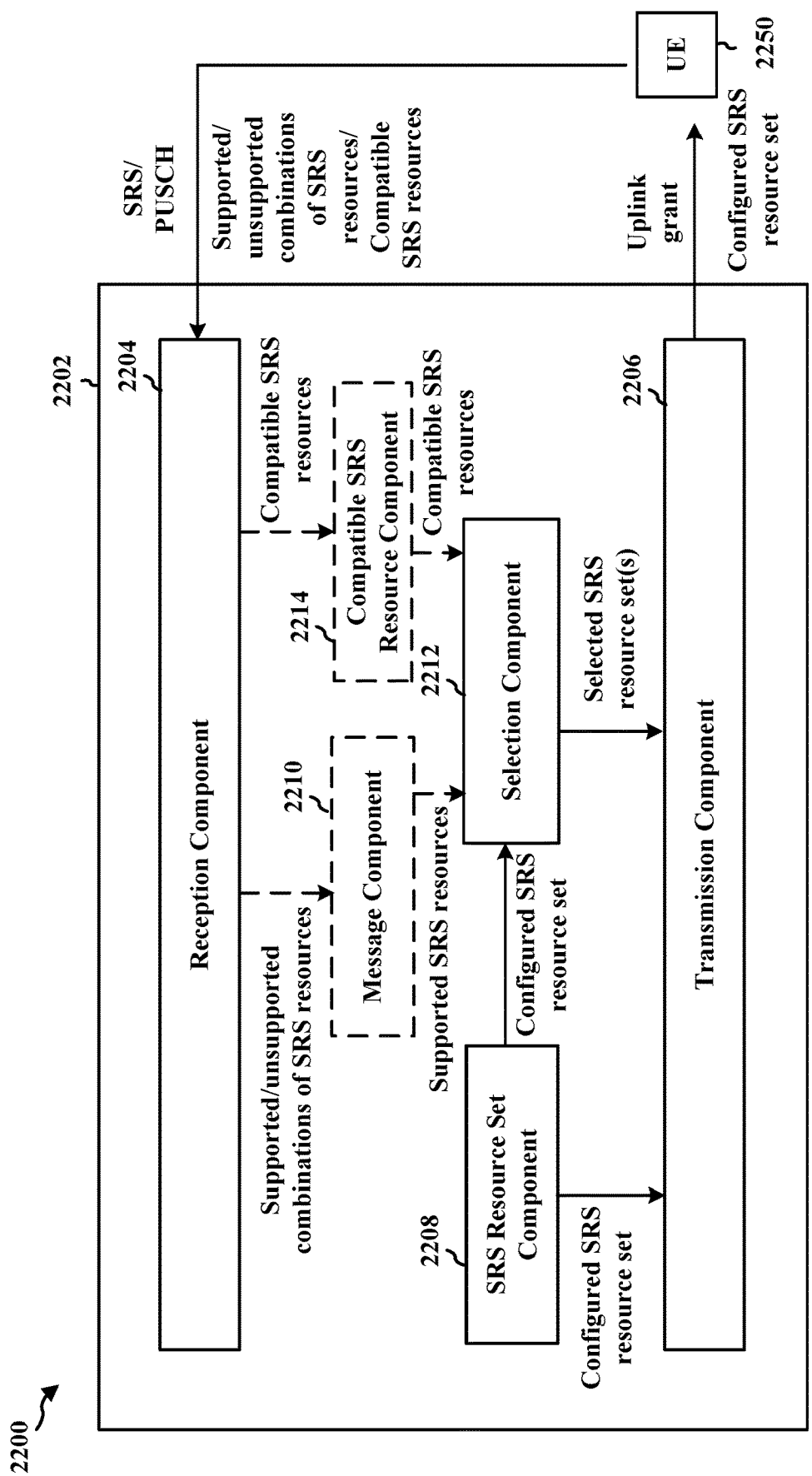
FIG. 22 is a conceptual data flow diagram illustrating the data flow between different components in an example apparatus in accordance with some aspects of the present disclosure.

FIG. 22 is a conceptual data flow diagram 2200 illustrating the data flow between different means/components in an example apparatus 2202. The apparatus may be a base station or a component of a base station. The apparatus 2202 includes a SRS resource set component 2208 that configures a UE 2250 for a SRS resource set for non-codebook-based SRS, the SRS resource set including a plurality of SRS resources, where each SRS resource in the SRS resource set is associated with a corresponding SRS port, such as described in connection with 2002 of FIG. 20 and 2102 of FIG. 21. In some aspects, the apparatus 2202 may include a message component 2210 that receives a message from the UE 2250 indicating at least one of supported combinations of SRS resources or unsupported combinations of SRS resources, such as described in connection with 2004 of FIG. 20. In some aspects, the apparatus 2202 may include a compatible SRS resource component 2214 that receives an indication of compatible SRS resources for the UE 2250 from among the plurality of SRS resources included in the SRS resource set configured for the UE 2250, such as described in connection with 2104 of FIG. 21. Finally, the apparatus 2202 includes a selection component 2212 that selects one or more SRS resource for the UE 2250 from the supported combinations of SRS resource, such as described in connection with 2006 of FIG. 20, or from the compatible SRS resources for the UE 2250, such as described in connection with 2106 of FIG. 21.

The apparatus 2202 may include additional components that perform each of the blocks of the algorithm in the aforementioned flowcharts of FIGS. 20 and 21. As such, each block in the aforementioned flowcharts of FIGS. 20 and 21 may be performed by a component and the apparatus 2202 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 23:
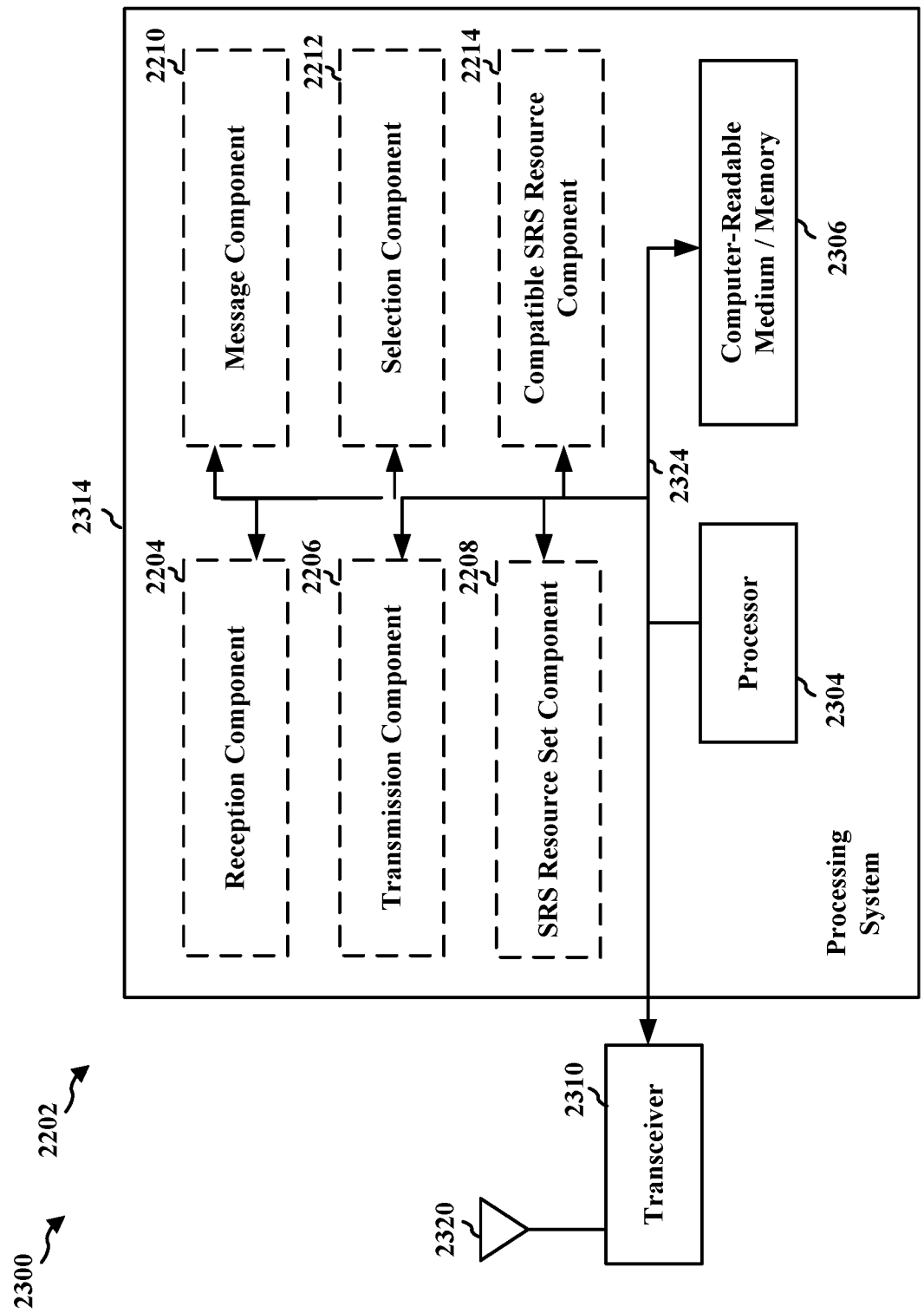
FIG. 23 is a diagram illustrating an example of a hardware implementation for an apparatus employing a processing system in accordance with some aspects of the present disclosure.

FIG. 23 is a diagram 2300 illustrating an example of a hardware implementation for an apparatus 2202 employing a processing system 2314. The processing system 2314 may be implemented with a bus architecture, represented generally by the bus 2324. The bus 2324 may include any number of interconnecting buses and bridges depending on the specific application of the processing system 2314 and the overall design constraints. The bus 2324 links together various circuits including one or more processors or hardware components, represented by the processor 2304, the components 2204, 2206, 2208, 2210, 2212, 2214, and the computer-readable medium/memory 2306. The bus 2324 may also link various other circuits such as timing sources, peripherals, voltage regulators, and power management circuits.

The processing system 2314 may be coupled to a transceiver 2310. The transceiver 2310 is coupled to one or more antennas 2320. The transceiver 2310 provides a means for communicating with various other apparatus over a transmission medium. The transceiver 2310 receives a signal from the one or more antennas 2320, extracts information from the received signal, and provides the extracted information to the processing system 2314, specifically the reception component 2204. In addition, the transceiver 2310 receives information from the processing system 2314, specifically the transmission component 2206, and based on the received information, generates a signal to be applied to the one or more antennas 2320. The processing system 2314 includes a processor 2304 coupled to a computer-readable medium/memory 2306. The processor 2304 is responsible for general processing, including the execution of software stored on the computer-readable medium/memory 2306. The software, when executed by the processor 2304, causes the processing system 2314 to perform the various functions described herein for any particular apparatus. The computer-readable medium/memory 2306 may also be used for storing data that is manipulated by the processor 2304 when executing software. The processing system 2314 further includes at least one of the components 2204, 2206, 2208, 2210, 2212, 2214. The components may be software components running in the processor 2304, resident/stored in the computer readable medium/memory 2306, one or more hardware components coupled to the processor 2304, or some combination thereof. The processing system 2314 may be a component of the base station 310 and may include the memory 376 or at least one of the TX processor 316, the RX processor 370, and the controller/processor 375. Alternatively, the processing system 2314 may be the entire base station (such as see 310 of FIG. 3).

In one configuration, the apparatus 2202 for wireless communication includes means for configuring UE for a SRS resource set for non-codebook-based SRS, the SRS resource set comprising a plurality of SRS resources, wherein each SRS resource in the SRS resource set is associated with a corresponding SRS port. In one configuration, the apparatus 2202 for wireless communication includes means for receiving a message from the UE indicating at least one of supported combinations of SRS resources or unsupported combinations of SRS resources. In one configuration, the apparatus 2202 for wireless communication includes means for selecting one or more SRS resource for the UE from the supported combinations of SRS resources. In one configuration, the apparatus 2202 for wireless communication includes means for receiving an indication of compatible SRS resources for the UE from among the plurality of SRS resources included in the SRS resource set configured for the UE. In one configuration, the apparatus 2202 for wireless communication includes means for selecting one or more SRS resource for the UE from the compatible SRS resources for the UE. The aforementioned means may be one or more of the aforementioned components of the apparatus 2202 or the processing system 2314 of the apparatus 2202 configured to perform the functions recited by the aforementioned means. As described herein, the processing system 2314 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 24:
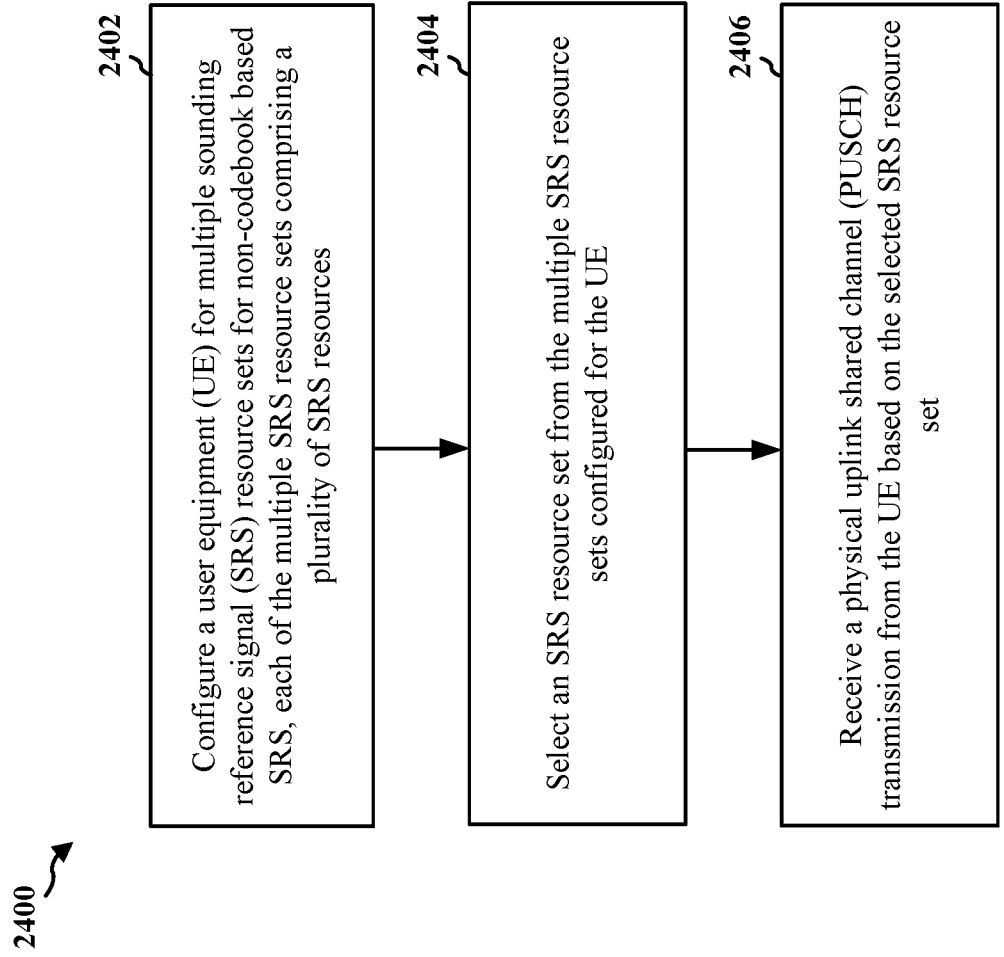
FIG. 24 is a flowchart illustrating a process for wireless communication that supports a configuration of a UE with multiple SRS resources sets in accordance with some aspects of the present disclosure.

FIG. 24 is a flowchart illustrating a process 2400 for wireless communication. The method may be performed by a base station or a component of a base station (such as the base station 102, 180, 310, 504, 904, 1104; the apparatus 2502; the processing system 2614, which may include the memory 376 and which may be the entire base station 310 or a component of the base station 310, such as the TX processor 316, the RX processor 370, or the controller/processor 375). The method may enable a base station to select between configured SRS resource sets for a UE.

At 2402, the base station configures a UE for multiple SRS resource sets for non-codebook-based SRS, each of the multiple SRS resource sets comprising a plurality of SRS resources. The configuration may be performed, for example, by the SRS resource set component 2508 of the apparatus 2502 in FIG. 25. For example the base station may configure two SRS resource sets for the UE, such as described in connection with FIG. 11.

At 2404, the base station selects an SRS resource set from the multiple SRS resource sets configured for the UE. The selection may be performed, for example, by the selected SRS resource set component 2510 of the apparatus 2502 in FIG. 25. The base station may transmit one or more SRI to the UE for the selected SRS resource set. The base station may transmit an indication of the selected SRS resource set in an uplink grant associated with the PUSCH transmission.

At 2406, the base station receives a PUSCH transmission from the UE based on the selected SRS resource set. The reception of the PUSCH transmission may be performed, for example, by the PUSCH component 2512 of the apparatus 2502 in FIG. 25.

Figure 25:
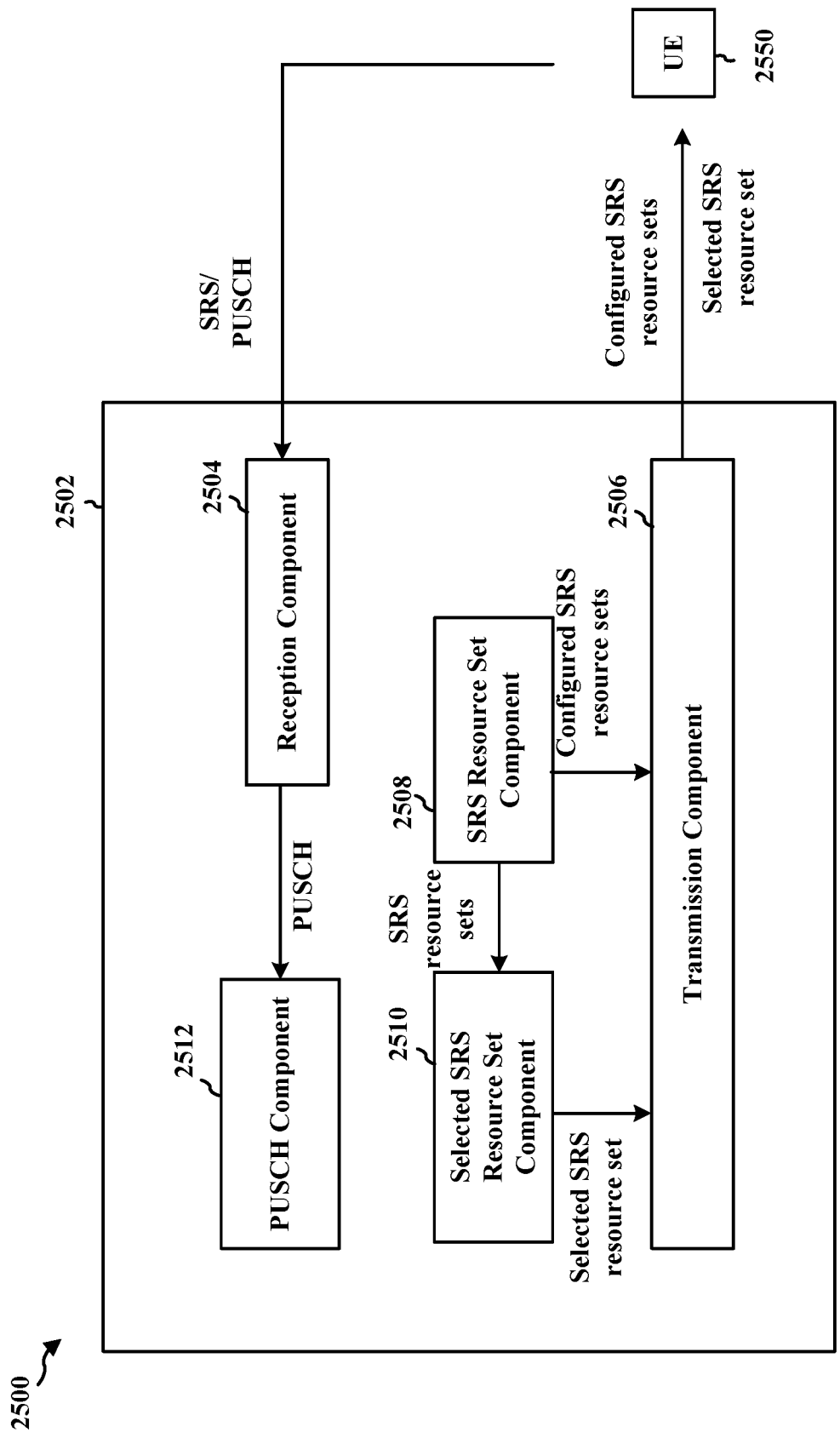
FIG. 25 is a conceptual data flow diagram illustrating the data flow between different components in an example apparatus in accordance with some aspects of the present disclosure.

FIG. 25 is a conceptual data flow diagram illustrating the data flow 2500 between different means/components in an example apparatus 2502. The apparatus may be a base station or a component of a base station. The apparatus 2502 may include an SRS resource set component 2508 that configures a UE 2550 for multiple SRS resource sets for non-codebook-based SRS, each of the multiple SRS resource sets comprising a plurality of SRS resources, such as described in connection with 2402 of FIG. 24. The apparatus 2502 may include a selected SRS resource set component 2510 that receives the SRS resource sets from the SRS resource set component 208 and selects an SRS resource set from the multiple SRS resource sets configured for the UE 2250, such as described in connection with 2404 of FIG. 24. The apparatus 2502 may include a transmission component 2506 that transmits one or more SRI to the UE for the selected SRS resource set. Finally, the apparatus 2502 includes a PUSCH component 2512 that receives a PUSCH transmission from the UE 2550 (such as through reception component 2504) based on the one or more SRI, such as described in connection with 2406.

The apparatus 2502 may include additional components that perform each of the blocks of the algorithm in the aforementioned flowchart of FIG. 24. As such, each block in the aforementioned flowchart of FIG. 24 may be performed by a component and the apparatus 2502 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 26:
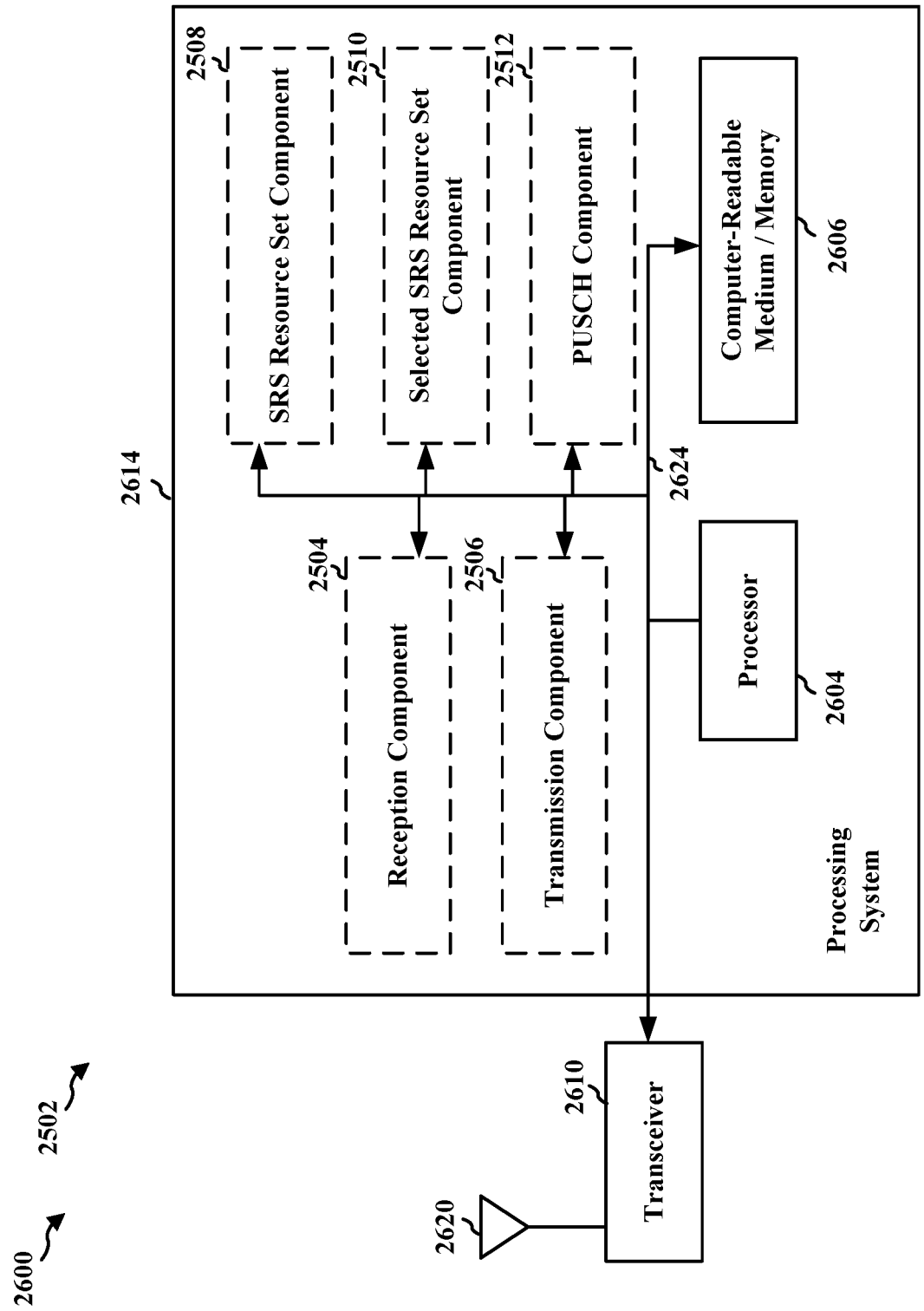
FIG. 26 is a diagram illustrating an example of a hardware implementation for an apparatus employing a processing system in accordance with some aspects of the present disclosure.

FIG. 26 is a diagram illustrating an example of a hardware implementation 2600 for an apparatus 2502 employing a processing system 2614. The processing system 2614 may be implemented with a bus architecture, represented generally by the bus 2624. The bus 2624 may include any number of interconnecting buses and bridges depending on the specific application of the processing system 2614 and the overall design constraints. The bus 2624 links together various circuits including one or more processors or hardware components, represented by the processor 2604, the components 2504, 2506, 2508, 2510, 2512, and the computer-readable medium/memory 2606. The bus 2624 may also link various other circuits such as timing sources, peripherals, voltage regulators, and power management circuits.

The processing system 2614 may be coupled to a transceiver 2610. The transceiver 2610 is coupled to one or more antennas 2620. The transceiver 2610 provides a means for communicating with various other apparatus over a transmission medium. The transceiver 2610 receives a signal from the one or more antennas 2620, extracts information from the received signal, and provides the extracted information to the processing system 2614, specifically the reception component 2504. In addition, the transceiver 2610 receives information from the processing system 2614, specifically the transmission component 2506, and based on the received information, generates a signal to be applied to the one or more antennas 2620. The processing system 2614 includes a processor 2604 coupled to a computer-readable medium/memory 2606. The processor 2604 is responsible for general processing, including the execution of software stored on the computer-readable medium/memory 2606. The software, when executed by the processor 2604, causes the processing system 2614 to perform the various functions described herein for any particular apparatus. The computer-readable medium/memory 2606 may also be used for storing data that is manipulated by the processor 2604 when executing software. The processing system 2614 further includes at least one of the components 2504, 2506, 2508, 2510, 2512. The components may be software components running in the processor 2604, resident/stored in the computer readable medium/memory 2606, one or more hardware components coupled to the processor 2604, or some combination thereof. The processing system 2614 may be a component of the base station 310 and may include the memory 376 or at least one of the TX processor 316, the RX processor 370, and the controller/processor 375. Alternatively, the processing system 2614 may be the entire base station (such as see 310 of FIG. 3).

In one configuration, the apparatus 2502 for wireless communication includes means for configuring a UE for multiple SRS resource sets for non-codebook-based SRS, each of the multiple SRS resource sets comprising a plurality of SRS resources. In one configuration, the apparatus 2502 for wireless communication includes means for selecting an SRS resource set from the multiple SRS resource sets configured for the UE. In one configuration, the apparatus 2502 for wireless communication may include means for transmitting one or more SRI to the UE for the selected SRS resource set. In one configuration, the apparatus 2502 for wireless communication includes means for receiving a PUSCH transmission from the UE based on the one or more SRI. The aforementioned means may be one or more of the aforementioned components of the apparatus 2502 or the processing system 2614 of the apparatus 2502 configured to perform the functions recited by the aforementioned means. As described herein, the processing system 2614 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

The specific order or hierarchy of blocks in the processes/flowcharts disclosed is an illustration of example approaches. Based upon design preferences, the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person of ordinary skill in the art to practice the various aspects described herein. Various modifications to these aspects will be readily apparent to those of ordinary skill in the art, and the generic principles defined herein may be applied to other aspects. The claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
receiving a configuration from a base station for a sounding reference signal (SRS) resource set for non-codebook-based SRS transmission, the SRS resource set comprising a plurality of SRS resources, each SRS resource in the SRS resource set being associated with a corresponding SRS port; and
transmitting, responsive to receiving the configuration, a UE capability message to the base station indicating:
one or more supported combinations of SRS resources of the SRS resource set,
one or more unsupported combinations of SRS resources of the SRS resource set, or
both the one or more supported combinations of SRS resources and the one or more unsupported combinations of SRS resources.

2. The method of claim 1, wherein each combination of SRS resources in the SRS resource set has a corresponding SRS resource indicator (SRI).

3. The method of claim 2, wherein transmitting the UE capability message includes transmitting an indication of a subset of SRIs that are not supported by the UE or an indication of SRIs supported by the UE.

4. The method of claim 3, wherein the indication of SRIs supported by the UE comprises an indication of SRIs associated with SRS resources of rank two or higher.

5. The method of claim 1, further comprising:
receiving, from the base station based on the one or more supported combinations of SRS resources, information scheduling at least one uplink transmission and indicating at least one SRS resource indicator (SRI); and
transmitting, to the base station, the at least one uplink transmission on a physical uplink shared channel (PUSCH) based on the information scheduling the at least one uplink transmission and at least one SRS on a supported combination of SRS resources corresponding to the at least one SRI.

6. The method of claim 1, further comprising:
determining whether a combination of SRS resources in the SRS resource set is supported based on whether an SRS is concurrently transmittable on each SRS resource of the combination of SRS resources; and
generating the UE capability message with the one or more supported combinations of SRS resources or the one or more unsupported combinations of SRS resources based on the determining of whether the combination of SRS resources in the SRS resource set is supported.

7. The method of claim 1, further comprising:
receiving information scheduling concurrent uplink transmissions to multiple transmit/receive points (TRPs) using at least one of the supported combinations of SRS resources;
transmitting, to a first TRP of the multiple TRPs, at least one SRS on a first subset of SRS resources included in the at least one supported combination of SRS resources based on the information scheduling the concurrent uplink transmissions; and
transmitting, to a second TRP of the multiple TRPs, at least one SRS on a second subset of SRS resources included in the at least one supported combination of SRS resources based on the information scheduling the concurrent uplink transmissions,
wherein the first subset of SRS resources is different than the second subset of SRS resources, and the at least one SRS on the first subset of SRS resources is concurrently transmitted with the at least one SRS on the second subset of SRS resources.

8. An apparatus for wireless communication at a user equipment (UE), comprising:
at least one processor; and
a memory coupled to the at least one processor storing code executable by the at least one processor to cause the apparatus to:
receive a configuration from a base station for a sounding reference signal (SRS) resource set for non-codebook-based SRS transmission, the SRS resource set comprising a plurality of SRS resources, each SRS resource in the SRS resource set being associated with a corresponding SRS port; and
transmit, responsive to the received configuration, a UE capability message to the base station indicating:
one or more supported combinations of SRS resources of the SRS resource set,
one or more unsupported combinations of SRS resources of the SRS resource set, or
both the one or more supported combinations of SRS resources and the one or more unsupported combinations of SRS resources.

9. The apparatus of claim 8, wherein each combination of SRS resources in the SRS resource set has a corresponding SRS resource indicator (SRI).

10. The apparatus of claim 9, wherein the UE capability message comprises an indication of a subset of SRIs that are not supported by the UE or an indication of SRIs supported by the UE.

11. The apparatus of claim 10, wherein the indication of SRIs supported by the UE comprises an indication of SRIs associated with SRS resources of rank two or higher.

12. The apparatus of claim 8, wherein the code executable by the at least one processor is further to cause the apparatus to:
receive, from the base station based on the one or more supported combinations of SRS resources, information scheduling at least one uplink transmission and indicating at least one SRS resource indicator (SRI); and
transmit, to the base station, the at least one uplink transmission on a physical uplink shared channel (PUSCH) based on the information scheduling the at least one uplink transmission and at least one SRS on a supported combination of SRS resources corresponding to the at least one SRI.

13. The apparatus of claim 8, wherein the code executable by the at least one processor is further to cause the apparatus to:
determine whether a combination of SRS resources in the SRS resource set is supported based on whether an SRS is concurrently transmittable on each SRS resource of the combination of SRS resources; and
generate the UE capability message with the one or more supported combinations of SRS resources or the one or more unsupported combinations of SRS resources based on the determination of whether the combination of SRS resources in the SRS resource set is supported.

14. The apparatus of claim 8, wherein the code executable by the at least one processor is further to cause the apparatus to:
   receive information scheduling concurrent uplink transmissions to multiple transmit/receive points (TRPs) using at least one of the supported combinations of SRS resources;
   transmit, to a first TRP of the multiple TRPs, at least one SRS on a first subset of SRS resources included in the at least one supported combination of SRS resources based on the information scheduling the concurrent uplink transmissions; and
   transmit, to a second TRP of the multiple TRPs, at least one SRS on a second subset of SRS resources included in the at least one supported combination of SRS resources based on the information scheduling the concurrent uplink transmissions,
   wherein the first subset of SRS resources is different than the second subset of SRS resources, and the at least one SRS on the first subset of SRS resources is concurrently transmitted with the at least one SRS on the second subset of SRS resources.

15. An apparatus for wireless communication at a user equipment (UE), comprising:
   means for receiving a configuration from a base station for a sounding reference signal (SRS) resource set for non-codebook-based SRS transmission, the SRS resource set comprising a plurality of SRS resources, each SRS resource in the SRS resource set being associated with a corresponding SRS port; and
   means for transmitting, responsive to the received configuration, a UE capability message to the base station indicating:
      one or more supported combinations of SRS resources of the SRS resource set,
      one or more unsupported combinations of SRS resources of the SRS resource set, or
      both the one or more supported combinations of SRS resources and the one or more unsupported combinations of SRS resources.

16. The apparatus of claim 15, wherein each combination of SRS resources in the SRS resource set has a corresponding SRS resource indicator (SRI).

17. The apparatus of claim 16, wherein the means for transmitting the UE capability message is configured to transmit an indication of a subset of SRIs that are not supported by the UE or an indication of SRIs supported by the UE.

18. The apparatus of claim 17, wherein the indication of SRIs supported by the UE comprises an indication of SRIs associated with SRS resources of rank two or higher.

19. The apparatus of claim 15, further comprising:
   means for receiving, from the base station based on the one or more supported combinations of SRS resources, information scheduling at least one uplink transmission and indicating at least one SRS resource indicator (SRI); and
   means for transmitting, to the base station, the at least one uplink transmission on a physical uplink shared channel (PUSCH) based on the information scheduling the at least one uplink transmission and at least one SRS on a supported combination of SRS resources corresponding to the at least one SRI.

20. The apparatus of claim 15, further comprising:
   means for receiving information scheduling concurrent uplink transmissions to multiple transmit/receive points (TRPs) using at least one of the supported combinations of SRS resources;
   means for transmitting, to a first TRP of the multiple TRPs, at least one SRS on a first subset of SRS resources included in the at least one supported combination of SRS resources based on the information scheduling the concurrent uplink transmissions; and
   means for transmitting, to a second TRP of the multiple TRPs, at least one SRS on a second subset of SRS resources included in the at least one supported combination of SRS resources based on the information scheduling the concurrent uplink transmissions,
   wherein the first subset of SRS resources is different than the second subset of SRS resources, and the at least one SRS on the first subset of SRS resources is concurrently transmitted with the at least one SRS on the second subset of SRS resources.

21. A non-transitory, computer-readable medium storing computer-executable code for wireless communication by a user equipment (UE), the code, when executed by at least one processor, to cause the at least one processor to:
   receive a configuration from a base station for a sounding reference signal (SRS) resource set for non-codebook-based SRS transmission, the SRS resource set comprising a plurality of SRS resources, each SRS resource in the SRS resource set being associated with a corresponding SRS port; and
   transmit, responsive to the received configuration, a UE capability message to the base station indicating:
      one or more supported combinations of SRS resources of the SRS resource set,
      one or more unsupported combinations of SRS resources of the SRS resource set, or
      both the one or more supported combinations of SRS resources and the one or more unsupported combinations of SRS resources.

* * * * *